US008419519B2

(12) United States Patent
Aoki et al.

(10) Patent No.: US 8,419,519 B2

(45) Date of Patent: Apr. 16, 2013

(54) WAGERING GAME WITH SYMBOLS FORMING AN ALTERED ARRAY OR SECONDARY ARRAY

(75) Inventors: Dion K Aoki, Henderson, NV (US); Allon G. Englman, Chicago, IL (US); Joel R. Jaffe, Glenview, IL (US); Shridhar P. Joshi, Naperville, IL (US); Larry J. Pacey, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 684 days.

(21) Appl. No.: 12/299,567

(22) PCT Filed: May 3, 2007

(86) PCT No.: PCT/US2007/010616

§ 371 (c)(1),
(2), (4) Date: Nov. 4, 2008

(87) PCT Pub. No.: WO2007/130444

PCT Pub. Date: Nov. 15, 2007

(65) Prior Publication Data

US 2009/0239631 A1 Sep. 24, 2009

Related U.S. Application Data

(60) Provisional application No. 60/797,600, filed on May 4, 2006.

(51) Int. Cl.
*A63F 13/00* (2006.01)

(52) U.S. Cl.
USPC .................. 463/16; 463/17; 463/18; 463/19; 463/20

(58) Field of Classification Search ............... 463/16–20
See application file for complete search history.

(56) References Cited

U.S. PATENT DOCUMENTS 4,099,722 A 7/1978 Rodesch et al.
4,200,291 A 4/1980 Hooker
(Continued)

FOREIGN PATENT DOCUMENTS

EP 0 058 488 A1 8/1982
EP 1 063 622 A2 12/2000
(Continued)

OTHER PUBLICATIONS

Tetris Attack Instruction Booklet, US release date Sep. 1, 1996, 13 pages.

(Continued)

*Primary Examiner* — Dmitry Suhol
*Assistant Examiner* — David Duffy
(74) *Attorney, Agent, or Firm* — Nixon Peabody LLP

(57) ABSTRACT

A gaming system for conducting a wagering game includes an input device for receiving a wager to play a wagering game. The gaming system further includes a primary display (14) for displaying a first array of symbols (173) that indicates a randomly selected outcome of the wagering game. The gaming system further includes a secondary display (16) for displaying a secondary array of symbols (181) that indicates a secondary outcome of the wagering game. In response to a predetermined criterion, at least one winning symbol (175*a*, 175*c*) is moved from a first position in the first array to a second position in the secondary array to create a modified secondary array that indicates a winning outcome.

19 Claims, 26 Drawing Sheets

U.S. PATENT DOCUMENTS

| | | | | |
|---|---|---|---|---|
| 4,636,951 | A | 1/1987 | Harlick | |
| RE34,244 | E | 5/1993 | Hagiwara | |
| 5,494,294 | A * | 2/1996 | Cappetta | 273/269 |
| 5,564,700 | A | 10/1996 | Celona | |
| 5,704,835 | A | 1/1998 | Dietz, II | |
| 5,720,662 | A | 2/1998 | Holmes, Jr. et al. | |
| 5,769,716 | A | 6/1998 | Saffari et al. | |
| 5,807,172 | A | 9/1998 | Piechowiak | |
| 5,890,962 | A * | 4/1999 | Takemoto | 463/20 |
| 5,951,397 | A | 9/1999 | Dickinson | |
| 5,980,384 | A | 11/1999 | Barrie | |
| 6,089,977 | A | 7/2000 | Bennett | |
| 6,117,013 | A | 9/2000 | Eiba | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,409,602 | B1 | 6/2002 | Wiltshire et al. | |
| 6,419,579 | B1 | 7/2002 | Bennett | |
| 6,544,120 | B2 * | 4/2003 | Ainsworth | 463/20 |
| 6,604,999 | B2 * | 8/2003 | Ainsworth | 463/20 |
| 6,855,054 | B2 | 2/2005 | White et al. | |
| 6,896,617 | B2 * | 5/2005 | Daly | 463/20 |
| 7,108,602 | B2 * | 9/2006 | Daly | 463/20 |
| 7,351,144 | B2 * | 4/2008 | Daly | 463/20 |
| 7,361,089 | B2 * | 4/2008 | Daly et al. | 463/20 |
| 7,611,406 | B2 * | 11/2009 | Fuller | 463/20 |
| 7,654,895 | B2 * | 2/2010 | Pacey | 463/16 |
| 7,927,204 | B2 * | 4/2011 | DeBrabander et al. | 463/16 |
| 2002/0077165 | A1 | 6/2002 | Bansemer et al. | |
| 2003/0017867 | A1 | 1/2003 | deKeller | |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0157981 | A1 | 8/2003 | Marks et al. | |
| 2004/0033829 | A1 | 2/2004 | Pacey et al. | |
| 2004/0043809 | A1 | 3/2004 | Gomez et al. | |
| 2004/0048650 | A1 | 3/2004 | Mierau et al. | |
| 2004/0048651 | A1 | 3/2004 | Vorias | |
| 2004/0092299 | A1 * | 5/2004 | Gauselmann | 463/16 |
| 2004/0097280 | A1 * | 5/2004 | Gauselmann | 463/16 |
| 2004/0242313 | A1 * | 12/2004 | Munoz | 463/20 |
| 2005/0107154 | A1 | 5/2005 | Pacey et al. | |
| 2006/0068892 | A1 | 3/2006 | Gomez et al. | |
| 2008/0051188 | A1 * | 2/2008 | Inamura | 463/20 |
| 2008/0070672 | A1 * | 3/2008 | Inamura | 463/20 |
| 2008/0102926 | A1 * | 5/2008 | Okada | 463/20 |

FOREIGN PATENT DOCUMENTS

| | | | |
|---|---|---|---|
| GB | 1 454 046 | A | 10/1976 |
| GB | 2 062 922 | A | 5/1981 |
| GB | 2 097 160 | A | 10/1982 |
| GB | 2 106 293 | A | 4/1983 |
| GB | 2 106 295 | A | 4/1983 |
| GB | 2 165 385 | A | 4/1986 |
| GB | 2 243 236 | A | 10/1991 |
| GB | 2 372 132 | A | 8/2002 |
| WO | WO 98/20949 | | 5/1998 |
| WO | WO 00/30727 | | 6/2000 |

OTHER PUBLICATIONS

"Bejeweled" description and screen shots from zone.msn.com/bejeweled, printed Aug. 7, 2008.

Zuma, (released in Dec. 2003) as described in Wikipedia webpage.

Written Opinion corresponding to co-pending International Patent Application Serial No. PCT/US2007/10616, European Patent Office, dated Sep. 16, 2008, 5 pages.

International Search Report corresponding to co-pending International Patent Application Serial No. PCT/US2007/10616, European Patent Office, dated Sep. 16, 2008, 5 pages.

Written Opinion corresponding to co-pending International Patent Application Serial No. PCT/US2007/10615, European Patent Office, dated Jul. 2, 2008, 4 pages.

International Search Report corresponding to co-pending International Patent Application Serial No. PCT/US2007/10615, European Patent Office, dated Jul. 2, 2008, 5 pages.

* cited by examiner

WAGERING GAME WITH SYMBOLS FORMING AN ALTERED ARRAY OR SECONDARY ARRAY

CROSS REFERENCE TO RELATED APPLICATIONS

This application is a U.S. national stage of International Application No. PCT/US2007/010616, filed May 3, 2007, which is related to and claims priority to U.S. Provisional Application No. 60/797,600, filed May 4, 2006, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to a wagering game having a bonus feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In many current wagering games, once the player has played the basic game, the game ends, even if the result is a winning outcome. Although the player may win credits from a winning game, there is some disappointment that the game has ceased so quickly.

Therefore, there is a need for a wagering game to allow multiple spins or wins on a single pay-in or wager.

SUMMARY OF THE INVENTION

According to one aspect of the present invention, a gaming system includes an input device for receiving a wager to play a wagering game. The gaming system further includes a primary display for displaying a first array of symbols that indicates a randomly selected outcome of the wagering game. The gaming system further includes a secondary display for displaying a secondary array of symbols that indicates a secondary outcome of the wagering game. In response to a predetermined criterion, at least one symbol is moved from a first position in the first array to a second position in the secondary array to create a modified secondary array that indicates a winning outcome.

According to another aspect of the present invention, a method of conducting a wagering game is disclosed. The method comprises displaying a plurality of symbols in a first array of symbols indicating a randomly selected outcome of the wagering game. The method further comprises, in response to a predetermined criterion, moving at least one symbol from a first position in the first array to a second position in a secondary array to create a modified secondary array indicating a winning outcome.

According to another aspect of the present invention, a gaming system includes an input device for receiving a wager to play a wagering game. The gaming system further includes a display for displaying an array of cells having a plurality of symbols that indicate a randomly selected outcome of the wagering game. In response to a predetermined criterion, at least one additional symbol is added to the array of cells to create a modified array that indicates a winning outcome. The number of symbols in the modified array is greater than the number of symbols in the array of cells. The number of cells in the modified array is the same as the number of cells in the array of cells.

According to another aspect of the present invention, a method of conducting a wagering game is disclosed. The method includes displaying an array of cells having a plurality of symbols that indicate a randomly selected outcome of the wagering game. The method further includes, in response to a predetermined criterion, adding at least one additional symbol to the array of cells to create a modified array. The number of symbols in the modified array is greater than the number of symbols in the array of cells. The number of cells in the modified array is the same as the number of cells in the array of cells.

According to another aspect of the present invention, a gaming system includes an input device for receiving a wager to play a wagering game. The gaming system further includes a display for displaying an array of cells including a playable portion and a non-playable portion. The playable portion includes a plurality of symbols indicating a randomly selected outcome of the wagering game. In response to a predetermined criterion, a modified playable portion including a winning outcome is displayed. The modified playable portion includes at least one additional cell of the non-playable portion.

According to another aspect of the present invention, a method of conducting a wagering game includes receiving a wager input. The method further includes displaying an array of cells including a playable portion and a non-playable portion. The playable portion includes a plurality of symbols indicating a randomly selected outcome of the wagering game. The method further includes, in response to a predetermined criterion, displaying a modified playable portion indicating a winning outcome. The modified playable portion includes at least one at least one additional cell of the non-playable portion.

Additional aspects of the invention will be apparent to those of ordinary skill in the art in view of the detailed description of various embodiments, which is made with reference to the drawings, a brief description of which is provided below.

DETAILED DESCRIPTION

Figure 1:
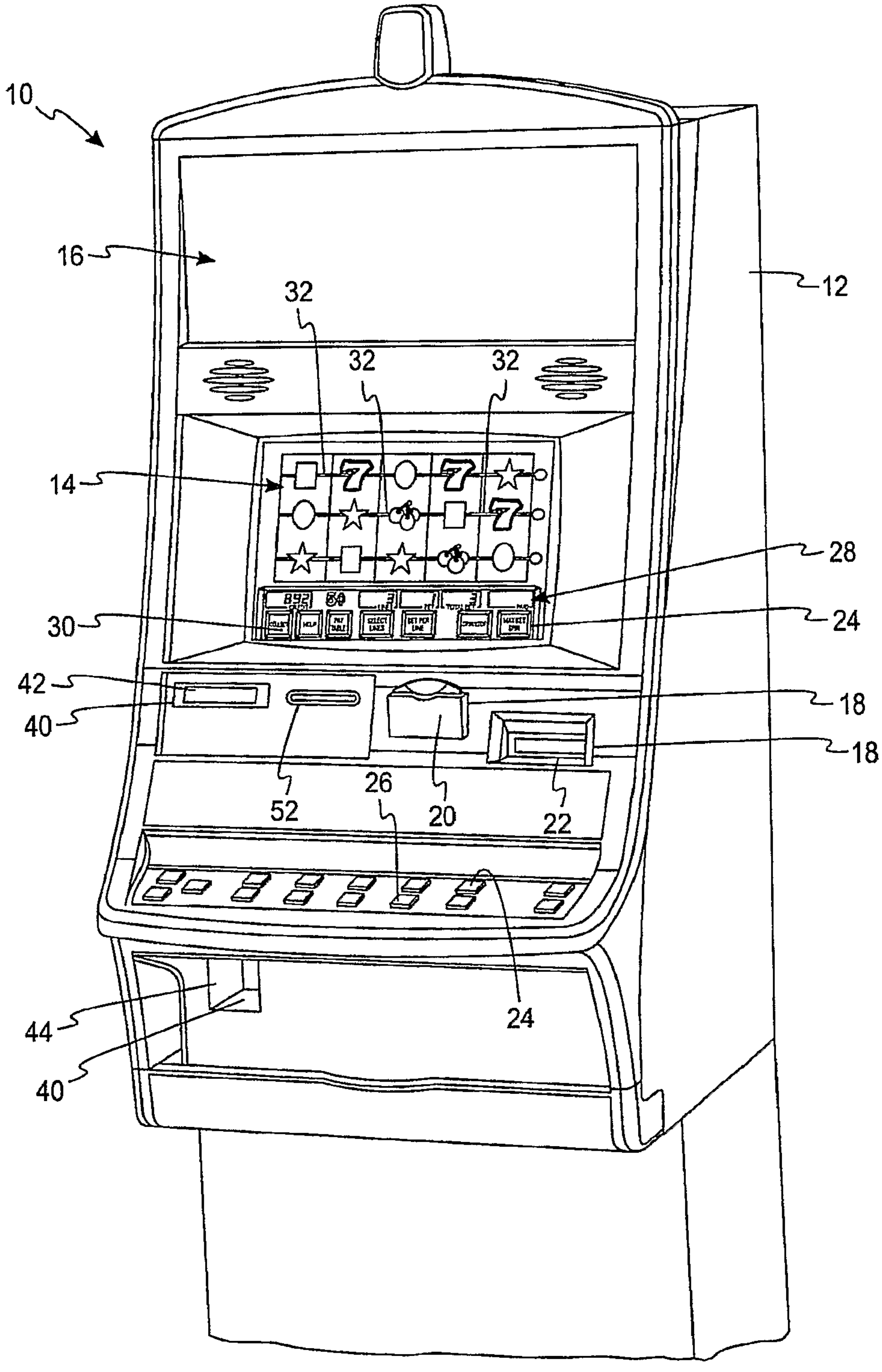
FIG. 1 is a perspective view of a gaming machine embodying the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
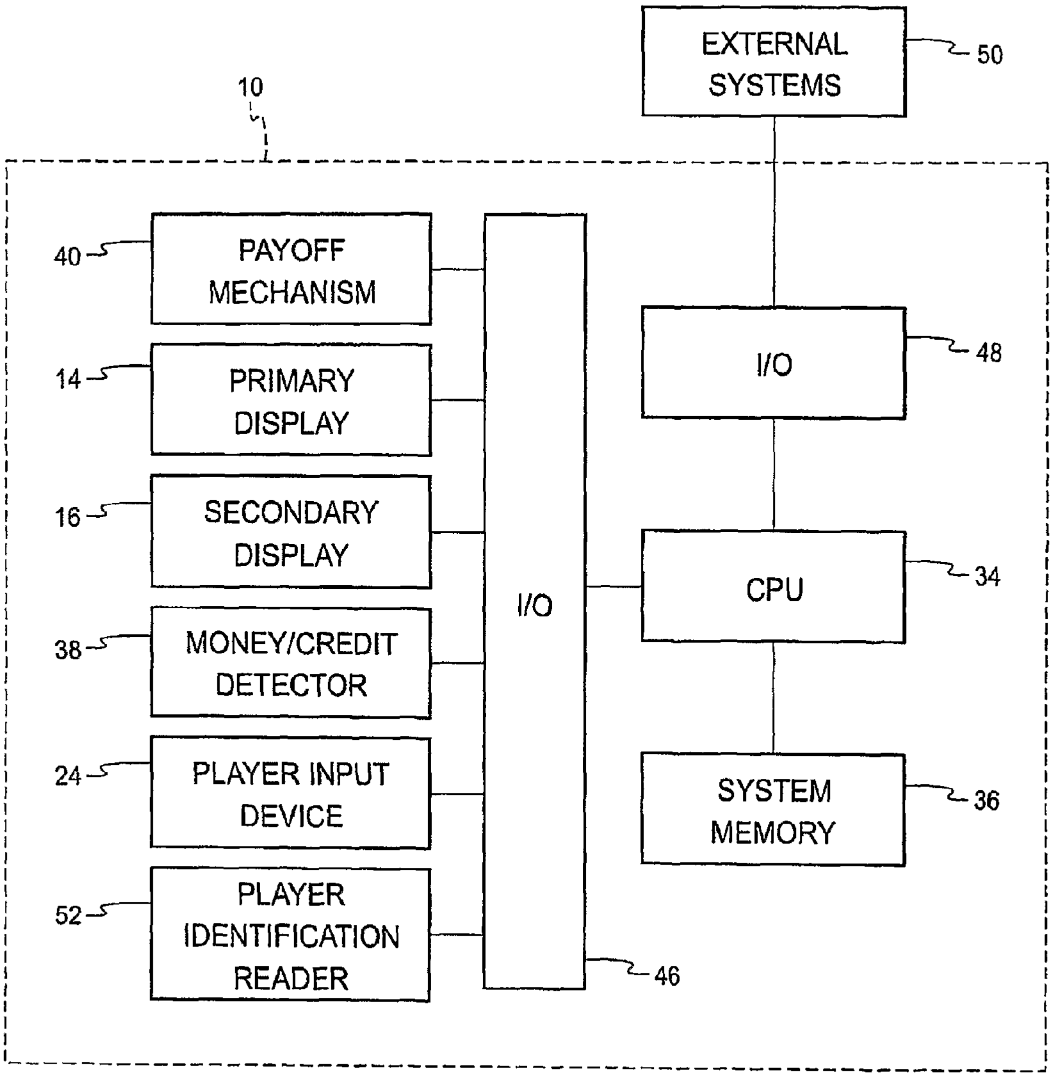
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
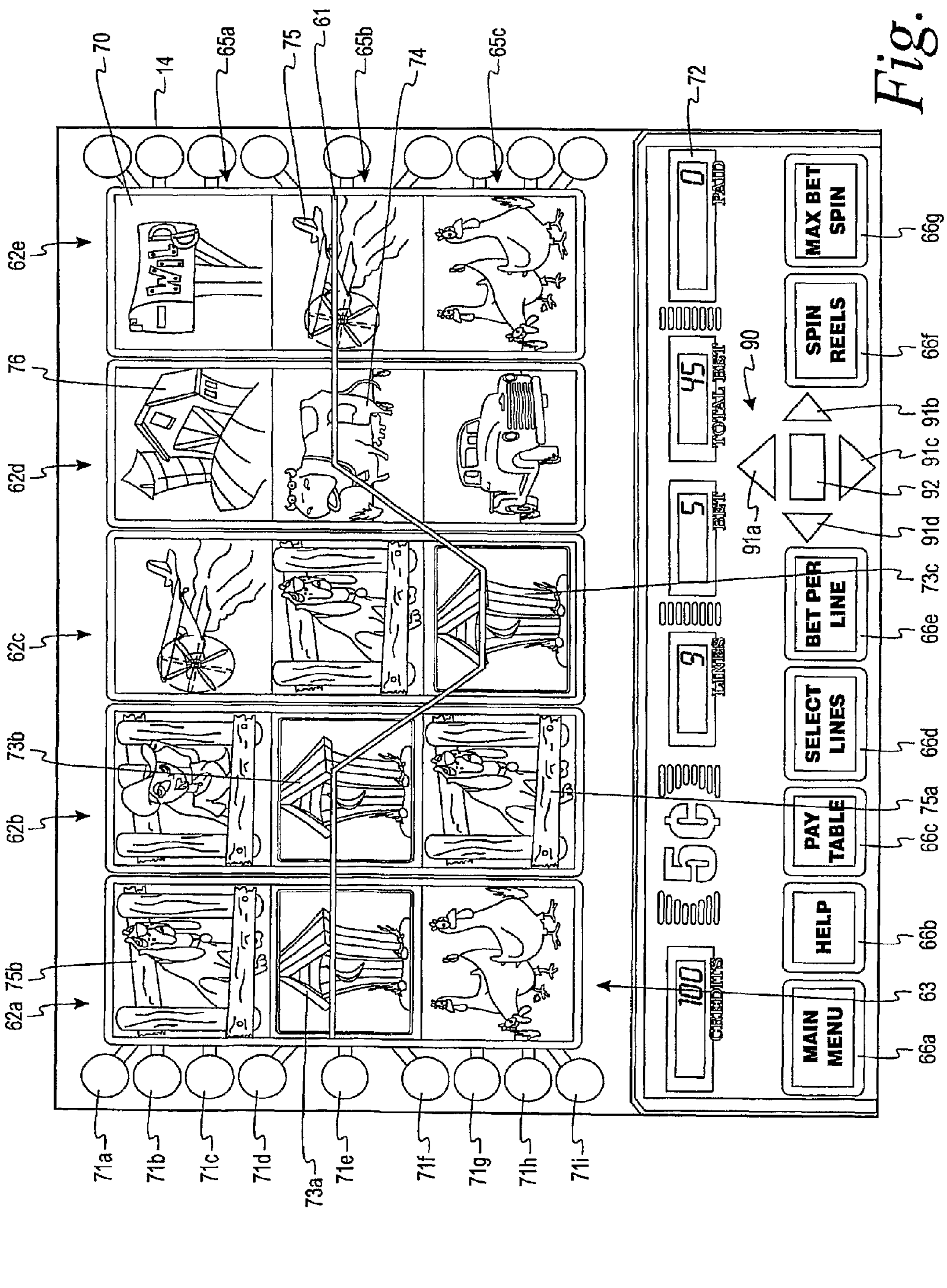
FIG. 3 is a display of an initial basic game screen according to one embodiment of the present invention.

Turning now to FIG. 3, the primary display 14 of one embodiment is shown in more detail. In this embodiment, the basic game is a slot machine game, with symbols on five different reels 62a, 62b, 62c, 62d, 62e. The reels 62a-e may be traditional mechanical reels, electromechanical reels, or computer-generated images of reels, with each reel having a plurality of symbols thereon. The symbols on the reels 62a-e fill an array 63 having three rows 65a, 65b, 65c and columns of the five reels 62a-e made of individual cells 70. In the illustrated embodiment, there are multiple pay lines shown by the pay line indicators 71a-i across the various reels 62a-e. While multiple pay lines are shown, a gaming terminal 10 with a single pay line may also be used with the present invention. An outcome indicator 72 indicates whether the outcome has resulted in a payout, a progressive jackpot, a bonus game, or whether it resulted in no reward at all.

In the illustrated examples, various combinations of symbols, either along active pay lines or in predefined cell locations, patterns, or quantities, may indicate prizes including monetary and non-monetary prizes. The non-monetary prizes include free spins, multipliers, entry into a bonus game, entry into a progressive game, or the like.

During the basic game of the illustrated embodiment of FIG. 3, the player places a wager on any number of the pay lines, as denoted by the pay line indicators 71a-i. In the illustrated embodiment, the wager may be between one and five credits per pay line. However, in other embodiments, other wager amounts may be made. Once the player has placed the wager and activated the "spin reels" button 66f, the reels 62a-e begin to spin. As illustrated in FIG. 3, near the bottom of the display 14 are a plurality of keys 66a-g that enable the player to perform various functions, such as select the pay lines to play, select a wager amount, and spin the reels 62a-e. The result of the spin may be displayed on one or more outcome indicators 72 located above the keys 66a-g. For example, the outcome indicator 72 may provide the player with information such as the amount of the current wager, the amount awarded, the total number of credits remaining, and the like. Winning pay lines may be highlighted on the primary display 14.

In the illustrated example of FIG. 3, the player has made a wager, and the reels 62a-e have spun. In this embodiment, pay line 61 traverses the middle cells on the first two reels 62a,b, the bottom cell on the third reel 62c, and the middle cells on the fourth and fifth reels 62d,e. At the conclusion of the reel spin depicted in FIG. 3, pay line 61 includes three outhouse symbols 73a-c, a cow symbol 74, and a plane symbol 75 creates a winning symbol combination. The player is awarded an initial basic game payout according to a basic game pay table, as shown on the outcome indicator 72. The pay table for the basic game indicates the possible winning combinations of symbols and the initial payout associated with each winning combination prior to any bonus events. For line pays (i.e., winning combinations that must appear on an active pay line), the payout is typically multiplied by the number of credits wagered on the winning pay line. For scatter pays (i.e., winning combinations that must appear on the display in a predetermined configuration but need not appear on an active pay line), the payout may be multiplied by the total number of credits wagered.

Symbol Scramble

Figure 4:
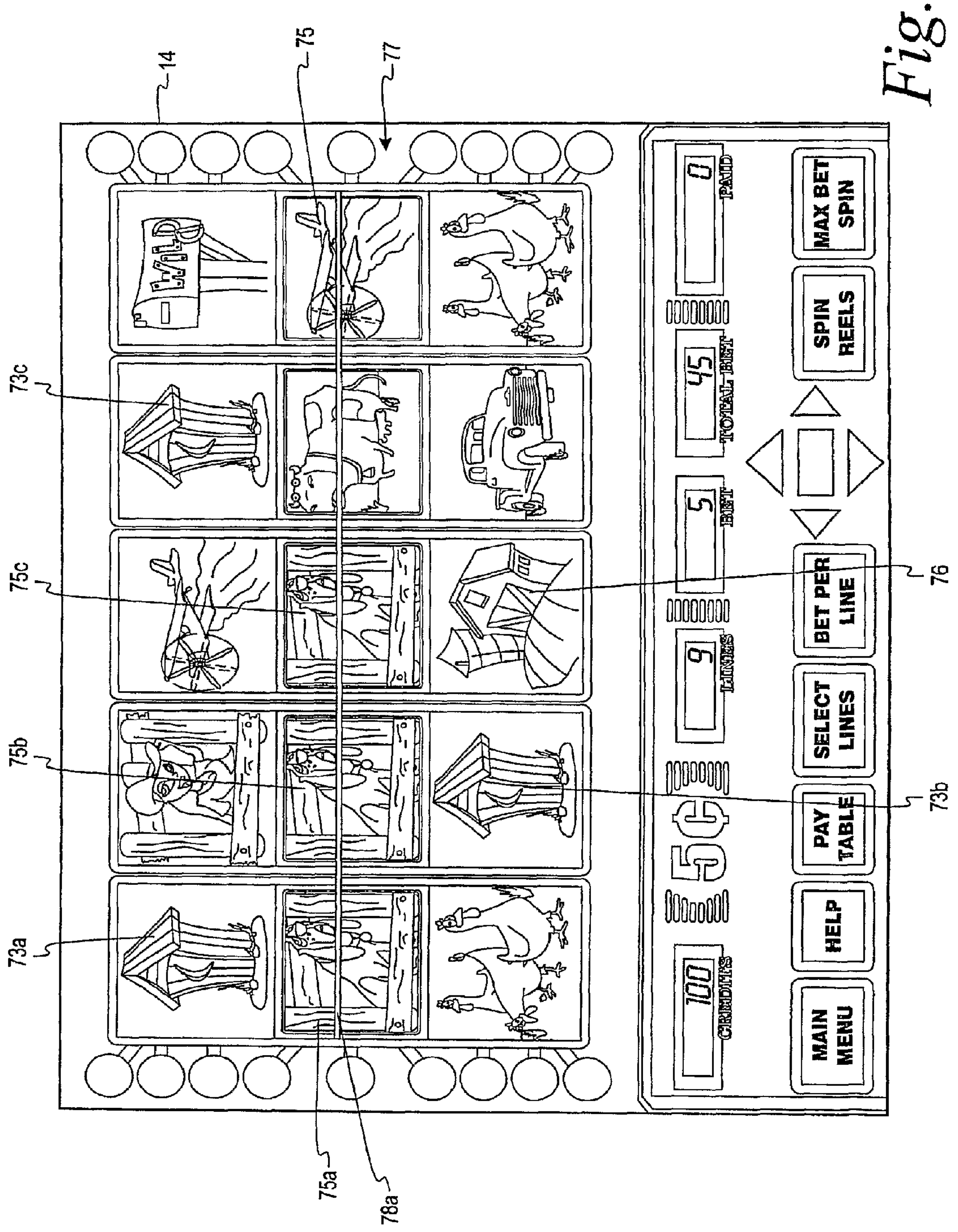
FIG. 4 is a display of a screen subsequent to FIG. 3 according to one embodiment of the present invention.

In many traditional gaming machines, the basic game concludes following the stopping of the reels, the evaluation of the winning combinations, and the payment of awards. However, according to one embodiment of the present invention, after a player achieves a winning symbol combination (e.g., on an activated pay line) and is awarded an initial basic game payout, one or more symbols of the winning combination is scrambled, or trades positions with another symbol, within the array. The symbols comprising the winning combination exchange positions with other symbols (e.g., non-winning symbols) of the array. As illustrated in FIGS. 3-4, the outhouse symbols 73a-c of the winning combination have traded positions with a dog symbol 75a, a second dog symbol 75b, and a farmhouse symbol 76, respectively, thus forming a modified array 77 (FIG. 4). However, the reels 62a-e have not been spun. Rather, the modified array 77 is formed using only the symbols in the original array 63, by scrambling the symbols 73a-c of the winning combination with other symbols in the array 63 that were not part of the winning combination.

After the scramble, the modified array 77 may be reevaluated for any new winning symbol combinations. It is contemplated that only the pay lines that were activated in the initial game may be reevaluated. It is also contemplated that all pay lines may be reevaluated. If the modified array 77 includes new winning symbol combinations, the player is awarded the payout associated with the new winning symbol combinations.

In FIG. 4, for example, a new winning symbol combination is achieved on a pay line 78a, which traverses the middle row of the modified array 77. The new winning combination of symbols—dog symbols 75a-c—may then again exchange positions with other symbols of the modified array 77 to create another modified array. This iterative process may be permitted to continue until no more winning symbol combinations are achieved. Alternatively, this may continue for a predetermined number of times (e.g., based on the number of credits initially wagered by the player).

In an alternative embodiment, less than all of the symbols of the winning combination may be scrambled. For example, the number of symbols of the winning combination that are scrambled may depend on the number of credits initially wagered by the player (e.g., one credit wagered yields one symbol scrambled, two credits wagered yield two symbols scrambled, etc.). It is contemplated that the number of symbols scrambled may also depend on other factors. Moreover, the player may be permitted to select which of the symbols of the winning combination and/or which non-winning symbols are to be scrambled, although the final locations of the scramble are not known to the player. It is further contemplated that the symbols that are to be scrambled may be randomly selected by the controller 34.

According to another embodiment, a gaming machine is provided. The gaming machine comprises an input device for receiving inputs from a player during a wagering game, the inputs including a wager amount. The gaming machine further comprises a display for displaying an array of symbols that indicates a randomly selected outcome of the wagering game. In response to the randomly selected outcome including a winning symbol combination, at least one winning symbol indicating the winning outcome is moved from a first position to a second position in the array of symbols to create a modified array that indicates an additional winning outcome. The one of the plurality of symbols at the second position may be moved to the first position.

According to another embodiment, a method of conducting a wagering game having a randomly selected outcome is provided. The method comprises displaying a plurality of symbols in an array indicating the randomly selected outcome. The method further comprises, in response to a winning outcome being indicated by a winning symbol combination along an active pay line, moving at least one winning symbol of the winning symbol combination to another position in the array. The moving may include trading positions with another symbol in the array.

Additive Symbols

According to another embodiment, after the player achieves a winning symbol combination in an initial spin, the player is awarded a bonus game. During the bonus game, one or more of the symbols of the winning combination of the initial spin are "frozen," or held in their corresponding position or cell 70 in the array. Additionally, a plurality of secondary symbols is added to each of the cells 70 having a frozen symbol. The secondary symbols may, for example, be randomly selected. Thus, a modified array may be formed in the bonus game in which one or more of the cells 70 previously containing a symbol from the initial winning combination include both the corresponding winning symbol of the initial spin and a secondary symbol. The resulting modified array may be reevaluated to determine whether additional winning symbol combinations including secondary symbols have been achieved. Additionally, prior to reevaluating the modified array, the non-winning symbols of the initial spin may be, for example, replaced with new symbols, shifted, scrambled, cascaded, or combinations thereof.

Figure 5A:
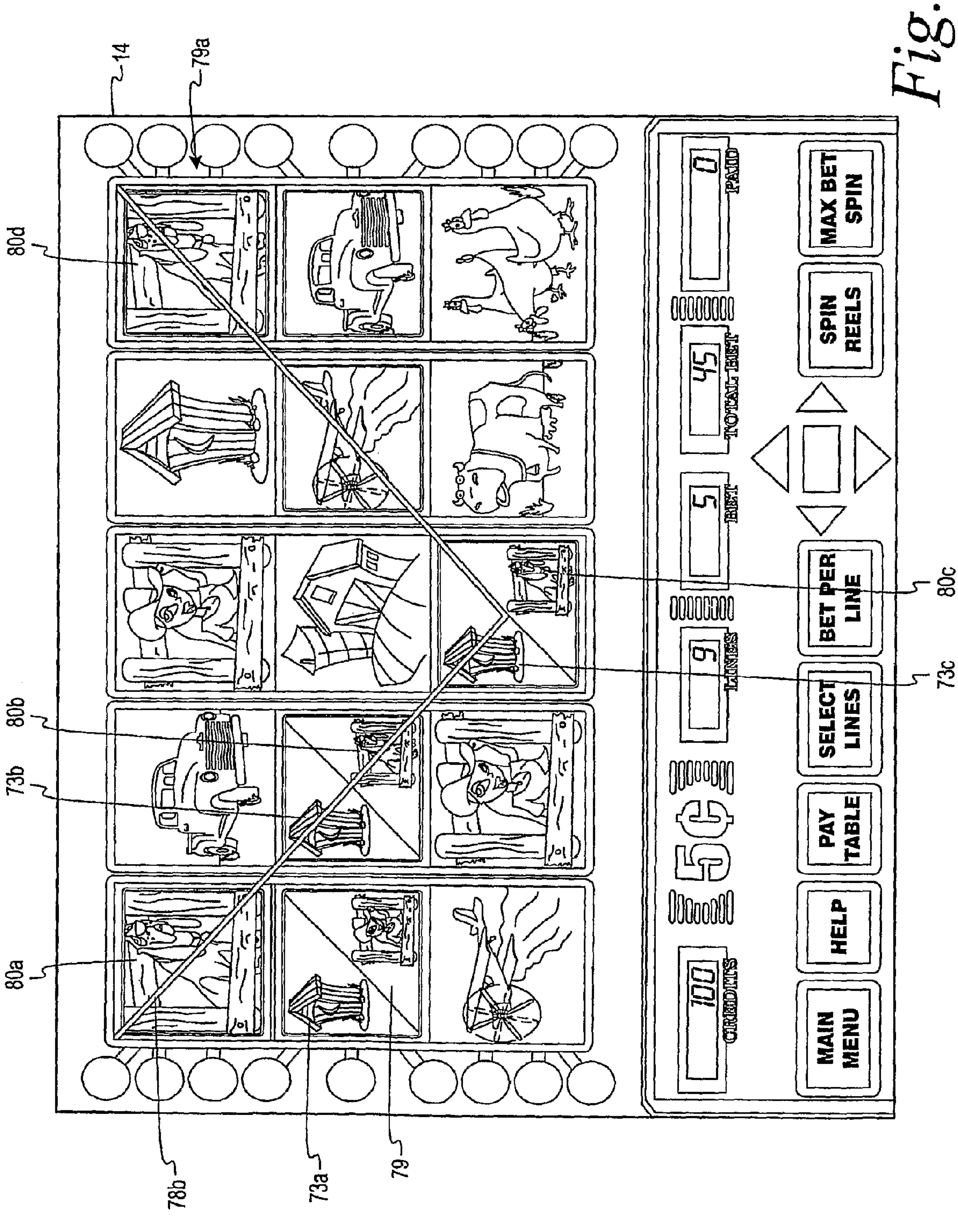
FIG. 5*a* is a display of a screen subsequent to FIG. 3 according to another embodiment of the present invention.

Referring back to FIG. 3, for example, the winning combination of outhouse symbols 73*a-c* is be frozen during the bonus game, and a secondary symbol 79 is added to each of the cells containing the frozen outhouse symbols 73*a-c*, as illustrated in FIG. 5*a*. The remaining, non-winning cells are replaced with other randomly selected, new symbols, forming a modified array 79*a*. The regeneration of additional symbols into the modified array 79*a* may result in one or more new winning symbol combinations being achieved in the bonus game. If a new winning combination is achieved, the player is awarded the payout associated with the new winning symbol combination. According to one embodiment, the player may also be awarded a second bonus game. In FIG. 5*a*, for example, the modified array 79*a* includes a new winning symbol combination including four dog symbols 80*a-d* on a pay line 78*b* forming a "V" shape on the modified array 79*a*, which may yield another payout and a second bonus game. In the illustrated embodiment, the four dog symbol combination 80*a-d* is formed by two regenerated dog symbols 80*a, d* and two secondary dog symbols 80*b,c*. It should be understood that additional wins may be formed using exclusively regenerated symbols, exclusively secondary symbols 79, or any combination thereof.

Figure 5B:
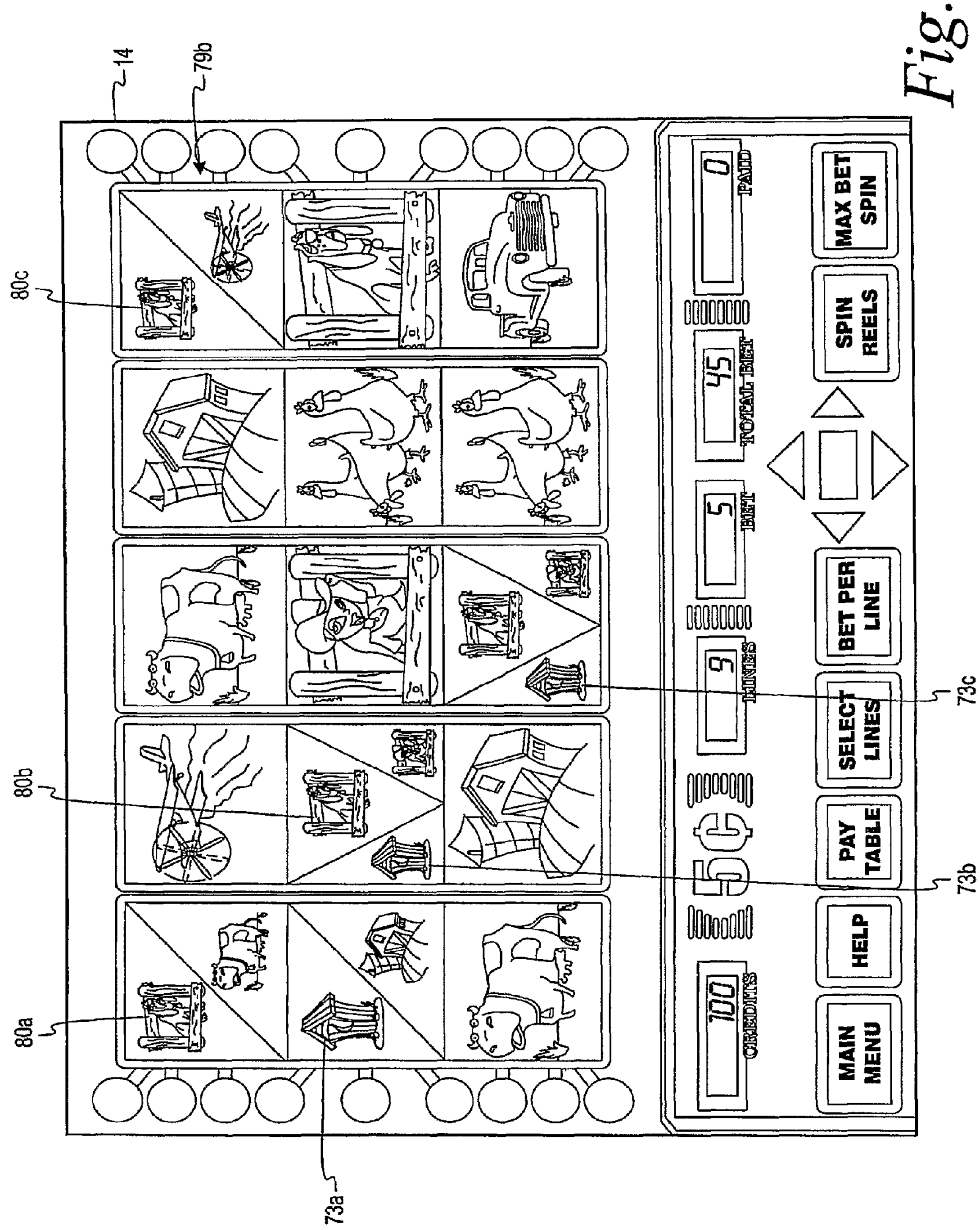
FIG. 5*b* is a display of a screen subsequent to FIG. 5*a;*

A second bonus game is shown in FIG. 5*b*. The second bonus game includes a further modified bonus array 79*b* resulting from the four dog symbol combination 80*a-d* in the first bonus game. During the second bonus game, the winning combination of outhouse symbols 73*a-c* from the initial game as well as the winning combination of dogs symbols 80*a-d* of the first bonus game are frozen and a tertiary symbol is added to each of the cells containing at least one of the outhouse symbols 73*a-c* and/or dogs symbols 80*a-d*, as illustrated in FIG. 5*b*. In an alternative embodiment, only the winning symbols of the immediately preceding spin may be frozen (i.e., the outhouse symbols 73*a-c* are removed—or "unfrozen") during the subsequent bonus game. Alternatively, only the initially winning symbols of the initial game may be frozen while the secondary symbols 79 are removed (i.e., the dog symbols 80*a-d* are removed—or "unfrozen"—during the second bonus game). The resulting second bonus array 79*b* may then be reevaluated. Alternatively, prior to reevaluating the second bonus array 79*b*, the non-winning symbols of the remaining cells may be again regenerated and replaced with new symbols, and the resulting second bonus array may then be reevaluated. This may continue until no more winning symbol combinations are achieved. Alternatively, this may continue for a predetermined number of times (e.g., based on the number of credits initially wagered by the player).

In some embodiments, to avoid repeated payouts for the same winning symbol combination, the payout for each winning symbol combination may only occur once. Thus, the winning combination of outhouse symbols 73*a-c* may not yield a winning combination in the following bonus game unless one or more of the outhouse symbols 73*a-c* is paired with at least one new or additional symbol to form a new winning symbol combination. In other embodiments, the gaming machine 10 may pay out for the winning combination of symbols of the initial game during a proceeding bonus game. Alternatively, the pay line that included the winning combination may be "deactivated" and, thus, may not yield another win during a proceeding bonus game.

Furthermore, it should be understood that less than all of the symbols of the winning combination may be frozen. For example, the number of symbols of the winning combination that are frozen may depend on the number of credits initially wagered by the player (e.g., one credit wagered yields one frozen symbol, two credits wagered yield two symbols frozen symbols, etc.). It is also contemplated that the number of frozen symbols may depend on other factors. Such an additive-symbol feature as illustrated in FIGS. 5*a* and 5*b* increases the player's anticipation of achieving a second winning symbol combination during a proceeding bonus game.

Modified Array

According to another embodiment of the present invention, the gaming machine 10 includes an array having a playable portion and a non-playable portion. The non-playable portion includes invisible and/or inactivated cells (e.g., rows or columns). In embodiments where the non-playable portion is visible, it is contemplated that the non-playable portion may be visually distinguished from the playable portion in various ways including, but not limited to, different colored backgrounds, brightness, borders, and combinations thereof. According to one embodiment of the present invention, if, during an initial spin, a player achieves a winning combination of symbols on the playable portion of the array, the player is awarded an initial payout and a bonus game. During the bonus game, the playable portion of the array is modified (e.g., shifted, enlarged, reduced, moved, or the like) to include one or more cells 70 of the non-playable portion of the array are made visible and/or activated and are, thus, added to the playable portion. The player is therefore provided with an additional and increased opportunity to achieve winning symbol combinations. It may be desirable for the non-playable portion of the array to be visible to the player such that the level of anticipation experienced by the player may be elevated.

Figure 6A:
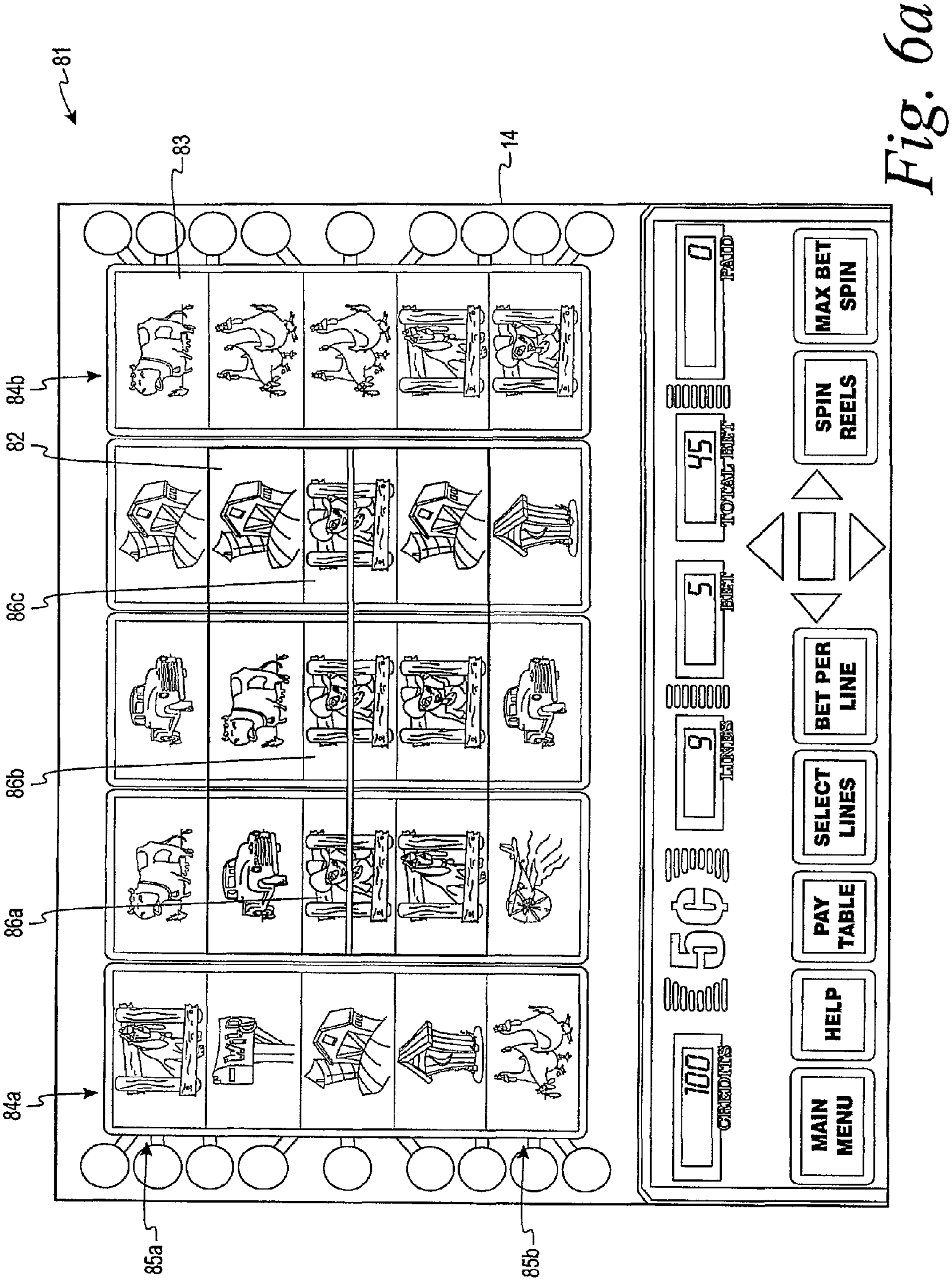
FIG. 6*a* is a display of an initial basic game screen according to another embodiment of the present invention.
Figure 6B:
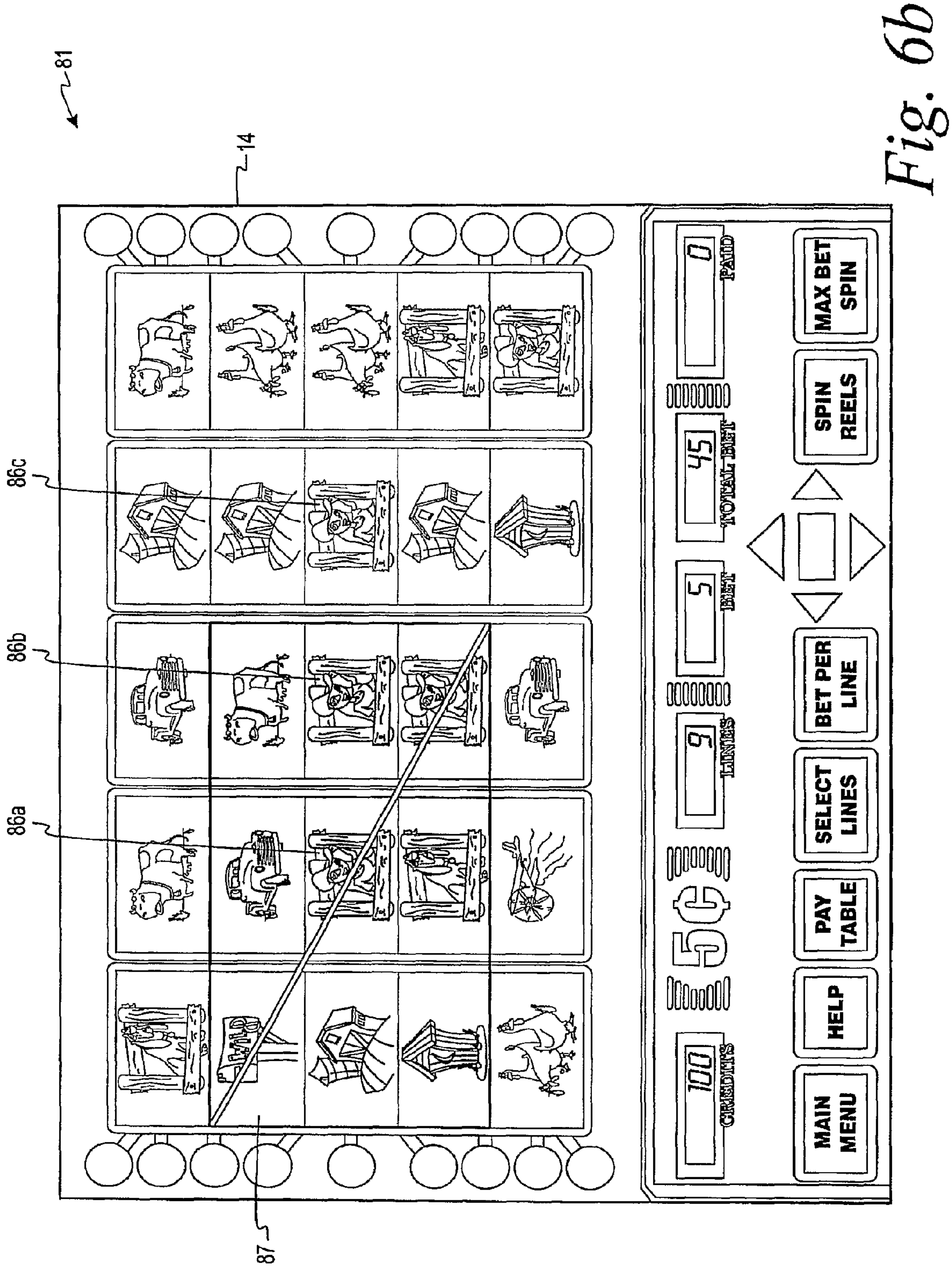
FIG. 6*b* is a display of a screen subsequent to FIG. 6*a;*
Figure 6C:
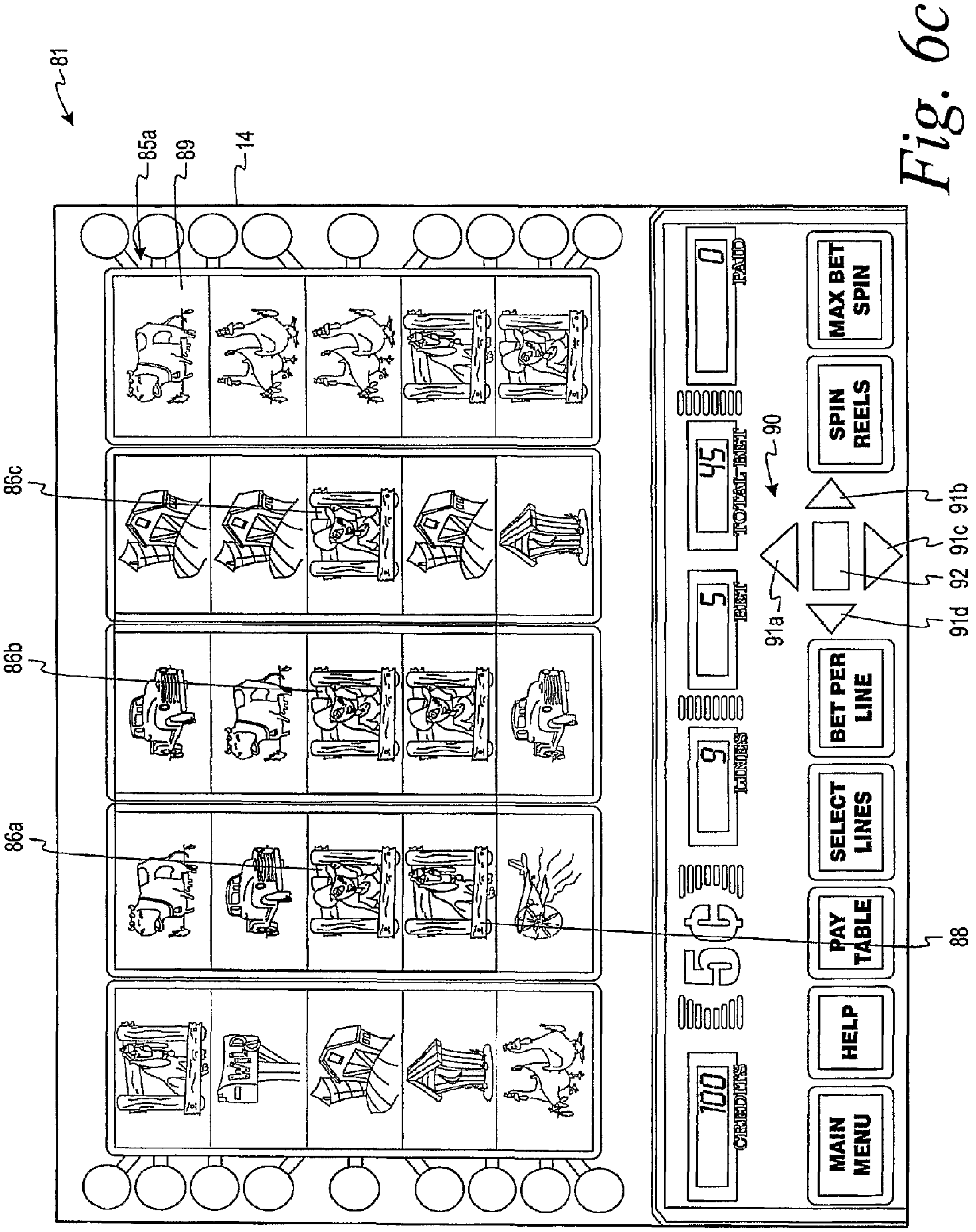
FIG. 6*c* is a display of another screen subsequent to FIG. 6*a;*

In the embodiment of FIGS. 6*a-c*, for example, a full 5×5 array 81 is illustrated. The full array 81 includes a playable portion 82, which is a 3×3 array. The full array 81 also includes a non-playable portion 83. In the illustrated embodiment of FIG. 6*a*, the non-playable portion 83 includes a column 84*a* to the left of the playable portion 82, a column 84*b* to the right of the playable portion 82, a row 85*a* above the playable portion 82, and a row 85*b* below the playable portion 82. Thus, the cells 70 of the non-playable portion 83 form a border around the playable portion 82. It should be understood that the non-playable portion 83 may include other portions of the full array 81. The non-playable portion 83 in the illustrated embodiment is visible but generally appears dimmer than the playable portion 82 of the full array 81.

In the embodiment of FIG. 6*a*, a player has achieved a winning combination in a middle pay line including three girl symbols 86*a-c*. After being awarded the initial payout, the playable portion 82 is shifted one column to the left, thereby forming a modified playable portion 87, as shown in FIG. 6*b*. The playable portion 82 of FIG. 6*a* may be shifted in any direction (i.e., left, right, up, down, or diagonal) to create the modified playable portion 87. Additionally, the playable portion 82 may be shifted more than one column, row, or combination of columns and rows, or may alternatively be reduced, enlarged, or the like to comprise the modified playable portion 87. The modified playable portion 87 of FIG. 6*b* may then be evaluated to determine whether additional winning symbol combinations have been achieved. If the new playable portion 87 includes an additional winning symbol combination, the player may be awarded the payout associated with the new winning symbol combination. Additionally, the modified playable portion 87 may be shifted such that a further modified playable portion (not shown) is formed. This may continue until no more winning combinations are achieved. Alternatively, this may continue for a predetermined number of times (e.g., based on the number of credits initially wagered by the player).

According to another embodiment, after at least one winning symbol combination is achieved in the playable portion, the array is modified so that at least one additional row and/or column from a non-playable portion of a corresponding full array is added to the playable portion. In the embodiment of FIG. 6*c*, for example, after achieving the winning combination of girl symbols 86*a-c* (see FIG. 6*a*), a portion of the non-playable portion 83 comprising the top row 85*a* is added to the playable portion 82 (see FIG. 6*a*), thus forming a new, 3×4 playable portion 88. It is contemplated that any cells, rows, columns, or combinations thereof of the non-playable portion 83 (see FIG. 6*a*) may be added to the playable portion 82. Which cells and/or the amount of cells of the non-playable portion 83 added to the playable portion 82 of the full array 81 may, for example, depend on how many credits the player initially wagered or on the winning combination of symbols. It is also contemplated that the cells 70 and/or the amount of cells of the non-playable portion 83 added to the playable portion 82 may depend on other factors or may be random.

The modified playable portion 88 may then be evaluated to determine whether new winning symbol combinations have been achieved. If the modified playable portion 88 includes new winning symbol combinations, the player may be awarded the payout associated with the new winning combination. Furthermore, cells (e.g., rows and/or columns) of the remaining non-playable portion 89 may be further added such that a further modified playable portion (not shown) is formed. This may continue until no more winning symbol combinations are achieved. Alternatively, this may continue for a predetermined number of times (e.g., based on the number of credits initially wagered by the player).

In modifying the array, the direction in which the playable portion is shifted, enlarged, reduced, or the like or the cells of the non-playable portion that are added to the playable portion may be determined in a variety of ways. According to one embodiment, for example, the shifting direction or cells to be added are randomly chosen by the gaming machine 10. According to another embodiment, the shifting direction or cells to be added are chosen by the player. For example, the player may be given a specified time interval in which to select a new playable portion by the player interacting with the gaming machine 10 (e.g., pressing a button). If the player has not interacted with the gaming machine 10 by the time the specified time interval lapses, the shifting direction or cells to be added are randomly determined by the gaming machine (e.g., controller 34). It is contemplated that the display may display the shifting direction or cells to be added if the player does not make his or her selection before the specified time interval lapses.

Additionally or alternatively, the gaming machine 10 may continuously randomly highlight a different, new playable portion, e.g., every fraction of a second. The playable portion 82 that is highlighted when the player interacts with the gaming machine (e.g., presses a button) becomes the modified playable portion 87 during the bonus game. According to one embodiment illustrated in FIG. 3*a*, for example, the gaming machine 10 includes an icon 90 having four arrows 91*a-d*. Each arrow 91*a-d* represents a different direction (i.e., up, down, left, right). A different arrow 91*a-d* is highlighted every, e.g., fraction of a second until a player interacts with the gaming machine (e.g., presses a button 92). The array may then be shifted in the direction corresponding with the arrow that is highlighted when the button 92 is pressed, and the resulting new playable portion may then be evaluated. Alternatively, one or more cells adjacent to the playable portion in the direction corresponding with the highlighted arrow may be added to the playable portion, and the resulting new playable portion may then be evaluated.

Figure 7A:
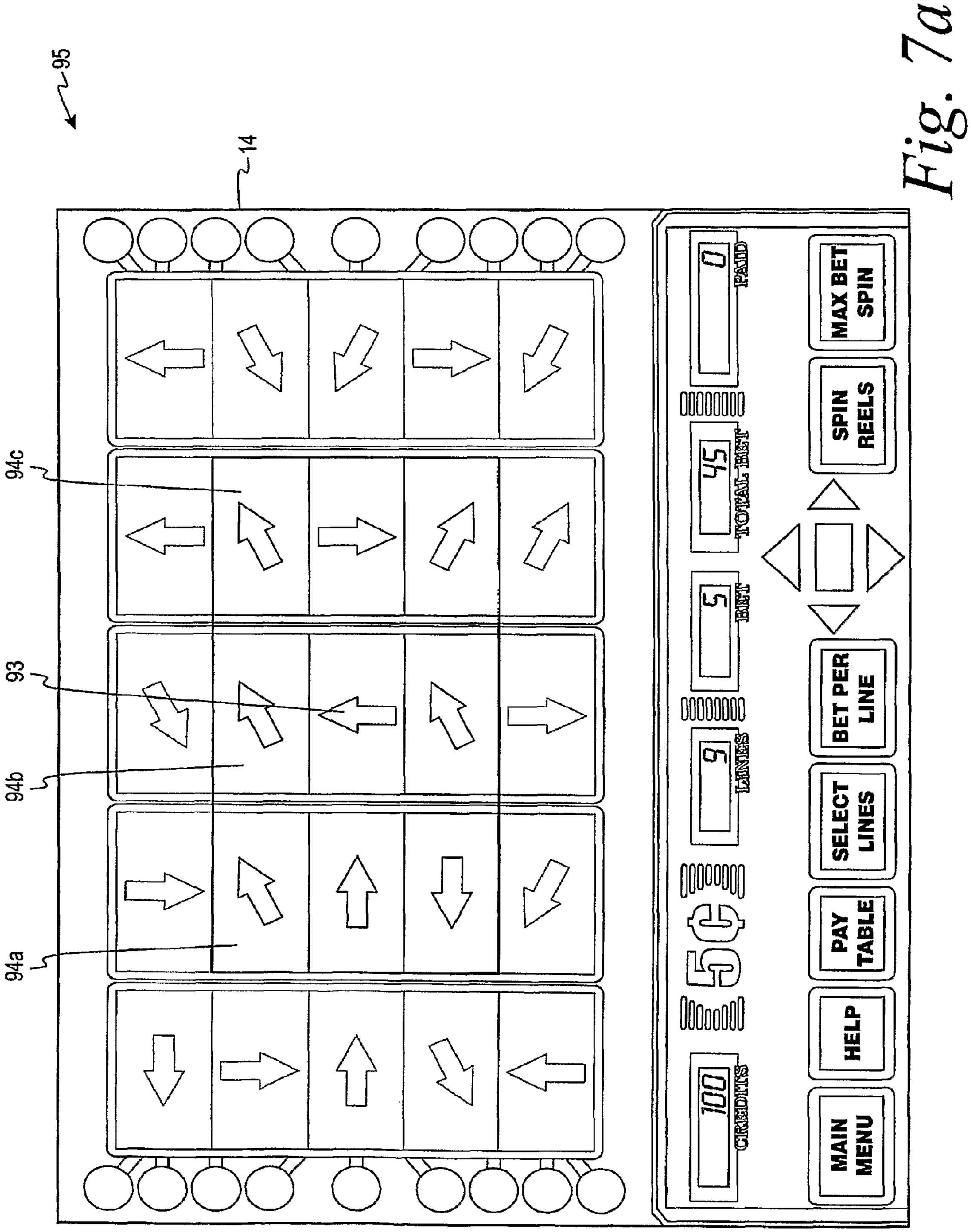
FIG. 7*a* is a display of an initial basic game screen according to another embodiment of the present invention.
Figure 7B:
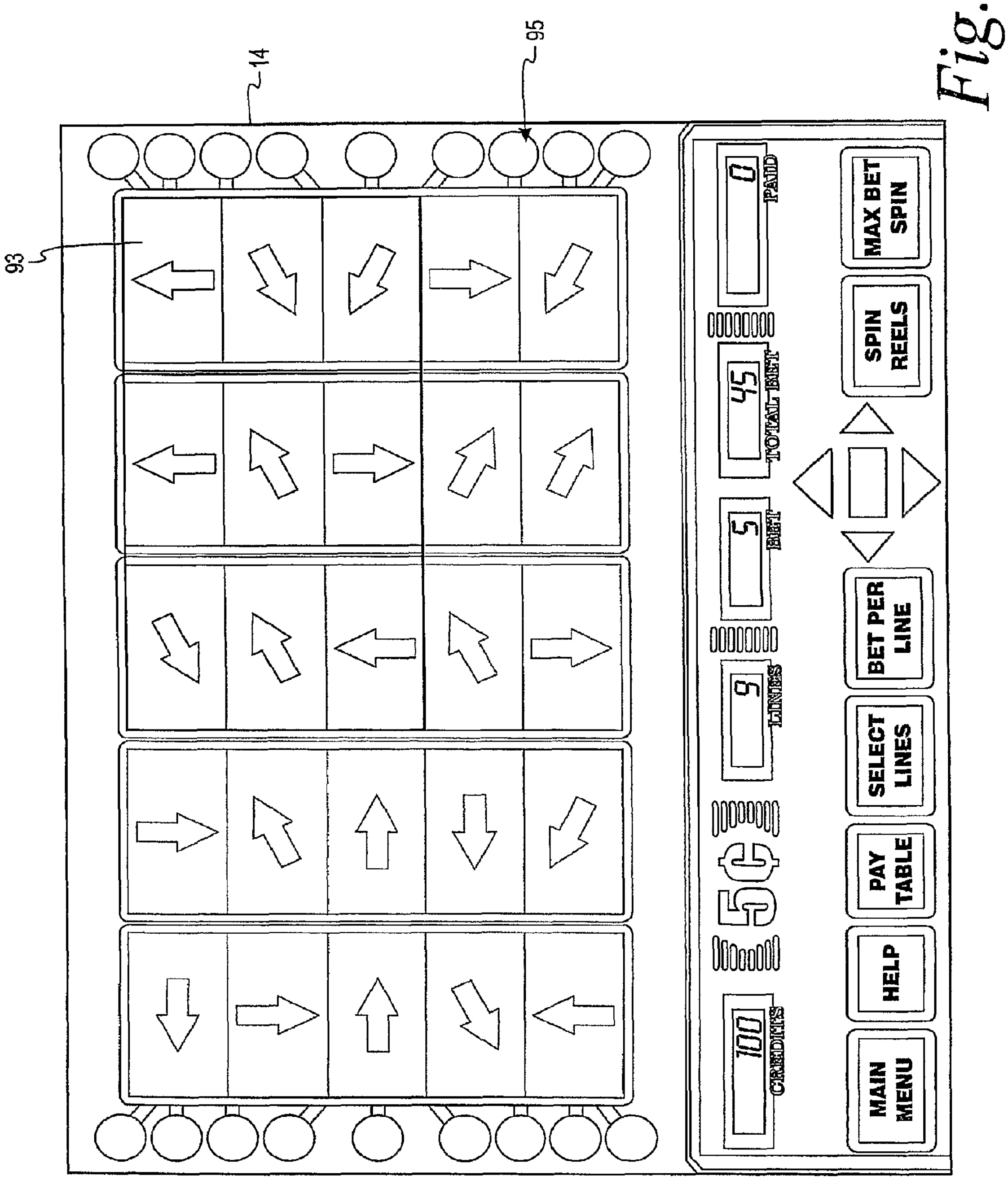
FIG. 7*b* is a display of a screen subsequent to FIG. 7*a;*
Figure 7C:
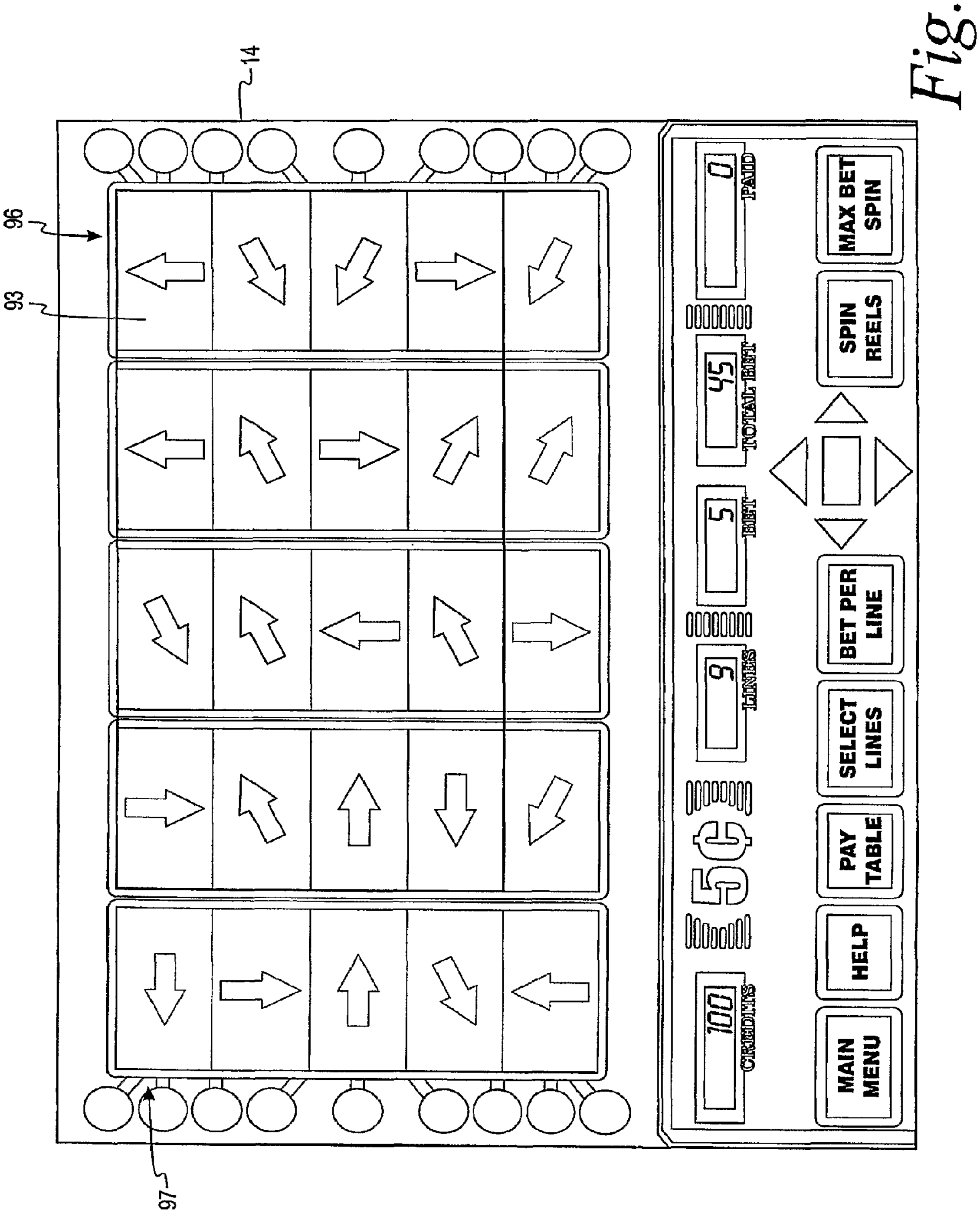
FIG. 7*c* is a display of another screen subsequent to FIG. 7*a;*

According to yet another embodiment, the shifting direction or cells to be added depend on the winning combination of symbols. Referring to FIG. 7*a*, for example, a winning combination of symbols of a playable portion 93 includes arrow symbols 94*a-c* pointing toward the upper right corner of a full array 95. According to one embodiment illustrated in FIG. 7*b*, the playable portion 93 is correspondingly shifted toward the upper right corner of the full array 95 (i.e., one column to the right and one row up). It is also contemplated that the playable portion 93 of FIG. 7*a* may be shifted either one column to the right or one row up. The determination may be made, for example, based on the player's choice, a selection made randomly by the gaming machine 10, or the like. According to another embodiment illustrated in FIG. 7*c*, a portion of a column 96 to the right of the initially playable portion 93 and a portion of a row 97 above the initially playable portion 93 are added to the initially playable portion 93 of FIG. 7*a*. It should be understood that either a portion of the column 96 to the right of the initially playable portion 93 or a portion of the row 97 above the initially playable portion 93 may be added to the initially playable portion 93. The determination may be made, for example, based on the player's choice, a selection made randomly by the gaming machine 10, or the like.

It is contemplated that the shifting direction or cells to be added may be indicated by a subscript depicted in a cell. For example, cells of an array may include subscripts having arrows pointing in various directions.

In some embodiments, to avoid repeated payouts for the same winning symbol combination, it is contemplated that the payout for each winning symbol combination may only occur once. In other embodiments, the gaming machine 10 may pay out for the same winning symbol combination more than once. It is contemplated that the shifting direction or cells to be added may be determined in ways other than those described herein.

Symbol Slide

According to another embodiment of the present invention, a player is awarded a bonus game in which each symbol of the winning symbol combination of the basic game shifts or slides in a first direction, e.g., at least one cell position up, down, right, left, or a combination thereof, thereby forming a modified array. The non-winning symbols adjacent to the winning combination of symbols in the first direction and/or in a direction opposite the first direction may also slide in the first direction. For example, if the symbols of the winning combination are to be slid upward, non-winning cells above and/or below the winning symbol combination may correspondingly be slid upward. New symbols may be added to the array. The modified array may then be evaluated.

Figure 8A:
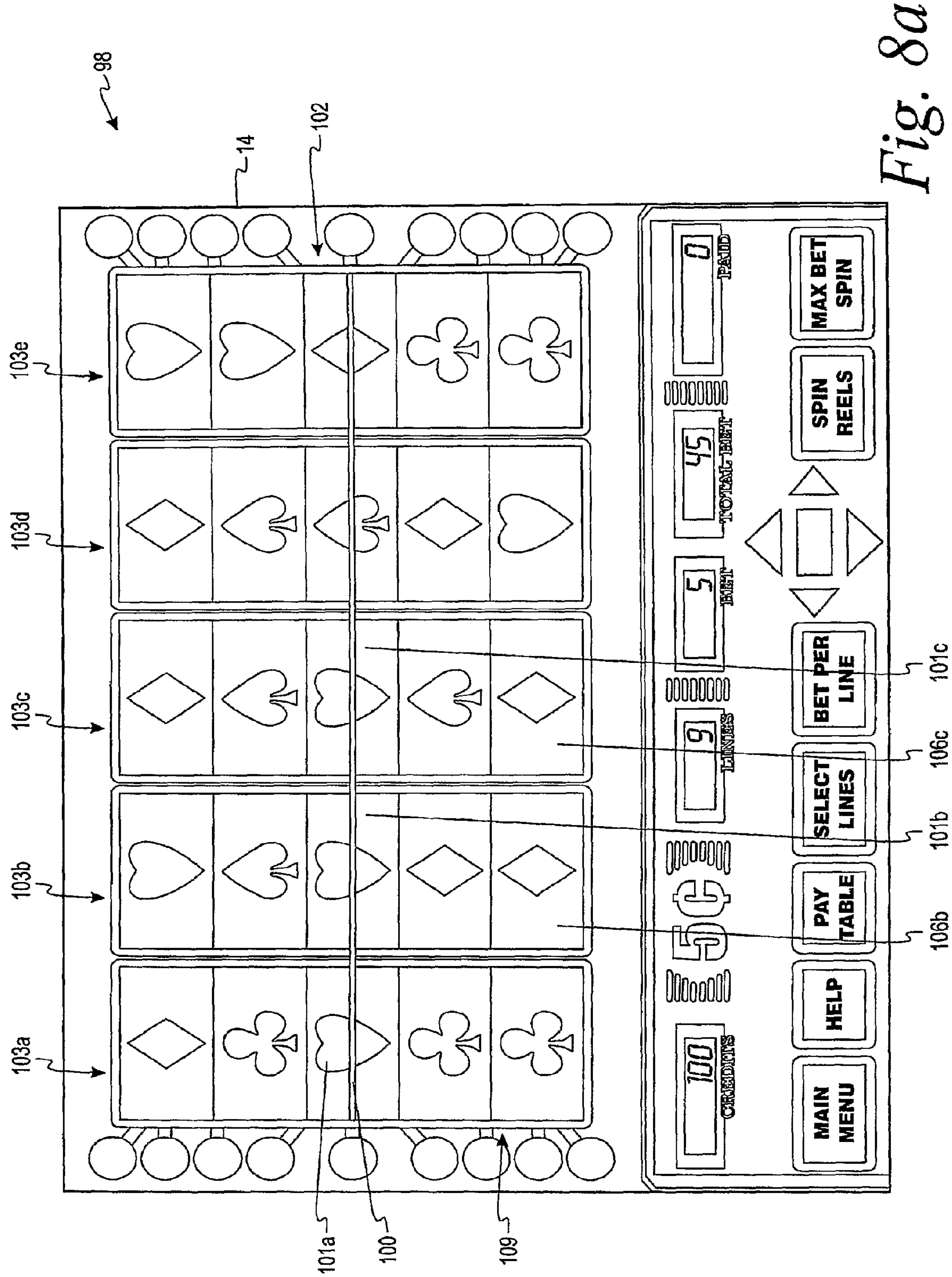
FIG. 8*a* is a display of an initial basic game screen according to another embodiment of the present invention.

In the embodiment of FIG. 8*a*, for example, a 5×5 array 98 includes a pay line 100 including a winning combination of heart symbols 101*a-c*. The heart symbols 101*a-c* are positioned in a middle row 102 and in a first column 103*a*, a second column 103*b*, and a third column 103*c*, respectively. According to the embodiment illustrated in FIG. 8*b*, during the bonus game, the winning combination of heart symbols 101*a-c* slides down one row into a row 104 below the middle row 102. Each of the symbols positioned in the columns 103*a-c* including the winning combination of heart symbols 101*a-c* correspondingly slide down one cell 70. The symbols positioned in remaining columns 103*d-e* do not slide or move. A resulting modified array 105 is illustrated in FIG. 8*b*.

In the embodiment of FIGS. 8*a,b*, the modified array 105 includes a new winning combination of four diamond symbols 106*a-d* in a pay line 108. The player may be awarded the payout associated with the new winning combination of diamond symbols 106*a-d*. Additionally, the player may be awarded a second bonus game in which the new winning combination of diamond symbols 106*a-d* slides at least one cell up, down, right, left, or a combination thereof, thereby forming a further modified array (not shown). This may continue until no more winning symbol combinations are achieved. Alternatively, this may continue for a predetermined number of times (e.g., based on the number of credits initially wagered by the player). In some embodiments, to avoid repeated payouts for the same winning combination, the payout for each winning symbol combination may only occur once. In other embodiments, the gaming machine 10 may pay out for the winning combination of symbols of the initial game again.

Figure 8B:
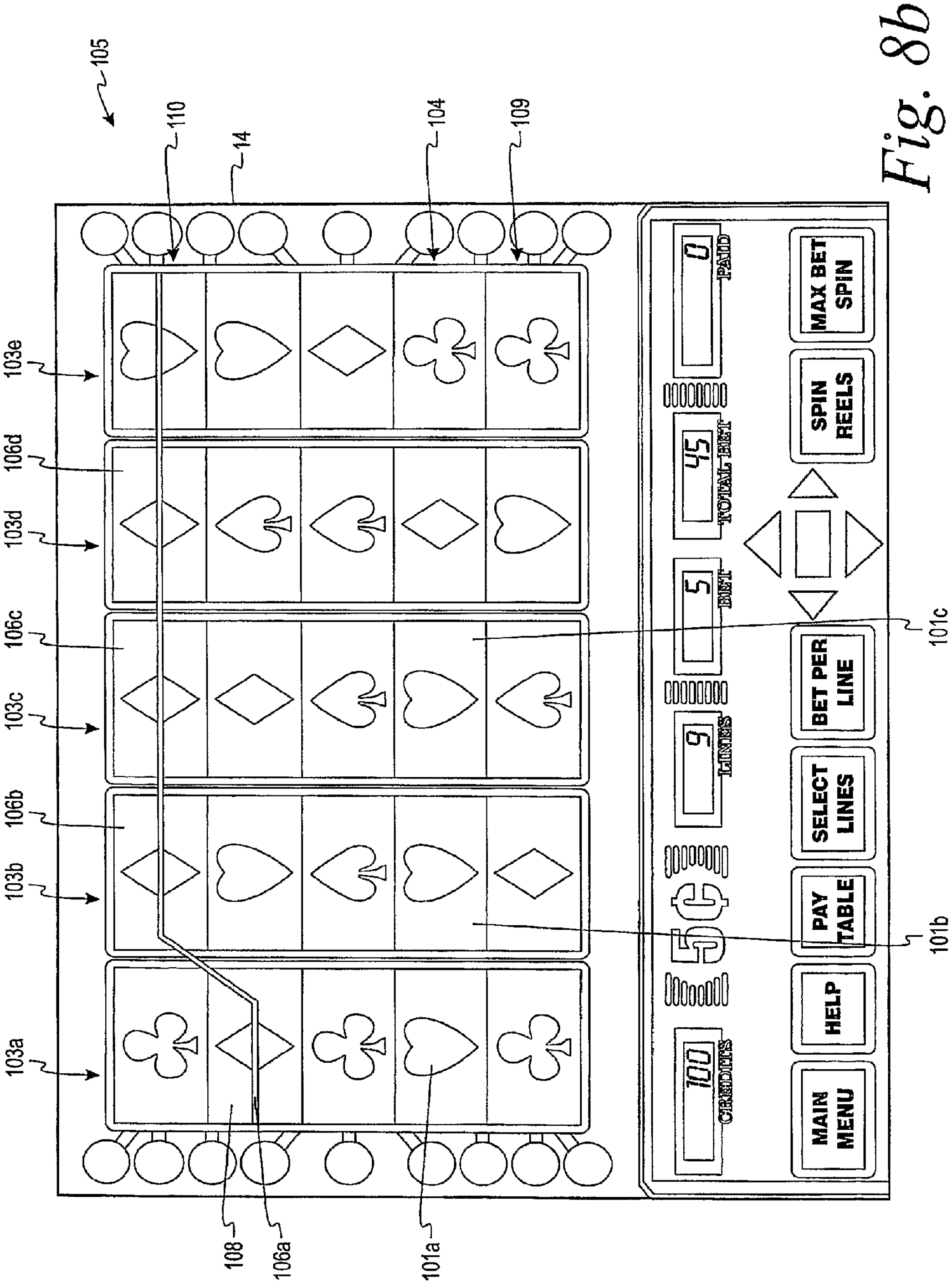
FIG. 8*b* is a display of a screen subsequent to FIG. 8*a;*

In the embodiment of FIG. 8*b*, when the symbols positioned in the columns 103*a-c* including the winning combination of heart symbols 101*a-c* slide down one row, the symbols previously positioned on a bottom row 109 of the corresponding columns 103*a-c* wrap around the corresponding columns 103*a-c* and become positioned on the top row 110 of the modified array 105. For example, the diamond symbol 106*a* is positioned in the first column 103*a* and the bottom row 109 of the array 98 of the basic game (FIG. 8*a*). During the bonus game, the diamond. symbol 106*a* wraps around the first column 103*a* and becomes positioned in the top row 110 of the first column 103*a* (see FIG. 8*b*). According to another embodiment, the symbols do not wrap around the corresponding row or column; instead, random, new symbols are added to the array.

It is contemplated that the direction in which the symbols of the array (e.g., array 98) having a winning symbol combination (e.g., heart symbols 101*a-c*) slide. may be determined in a variety of ways. Non-limiting examples of how this direction may be determined are described above with respect to the embodiment of FIGS. 6*a-c* and 7*a-c*.

According to another embodiment, a gaming machine is provided. The gaming machine comprises an input device for receiving inputs from a player during a wagering game, the inputs including a wager amount. The gaming machine further comprises a display for displaying an array of symbols that indicates a randomly selected outcome of the wagering game. In response to the randomly selected outcome including a winning symbol combination, at least one winning symbol indicating the winning outcome is moved from a first position to a second position in the array of symbols to create a modified array that indicates an additional winning outcome. The first position may be adjacent to the second position in a first direction. At least one of the plurality of symbols adjacent to the at least one winning symbol may be moved in the first direction.

According to another embodiment, a method of conducting a wagering game having a randomly selected outcome is provided. The method comprises displaying a plurality of symbols in an array indicating the randomly selected outcome. The method further comprises, in response to a winning outcome being indicated by a winning symbol combination along an active pay line, moving at least one winning symbol of the winning symbol combination to another position in the array. The moving may include sliding the at least one winning symbol in a first direction. The method may further comprise sliding an at least one non-winning symbol in the first direction, the at least one non-winning symbol being directly adjacent to the at least one winning symbol along a winning pay line.

Hold/Cascade Corresponding Symbols on Secondary Display

Figure 9A:
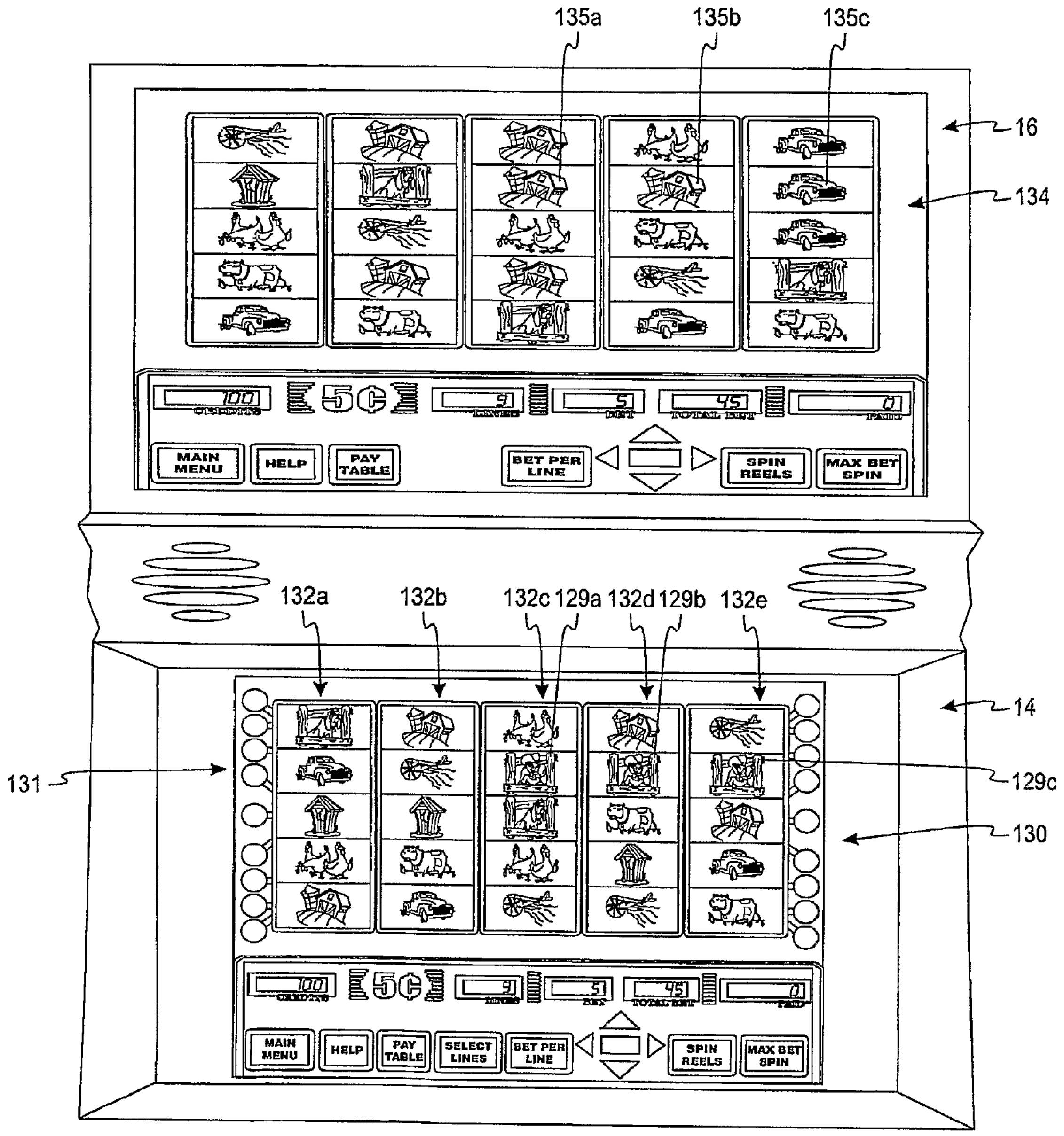
FIG. 9*a* is a display of an initial basic game screen and a secondary screen according to one embodiment of the present invention.

According to another embodiment of the present invention, the primary display 14 includes a first array 130 and the secondary display 16 includes a secondary array 134 (see, e.g., FIG. 9*a*). A winning combination of symbols in the first array may trigger a modification of symbols of the second array. For example, symbols of the secondary array located in cell positions corresponding with cell positions of one or more winning symbols of the first array may be "autoheld," cascaded, or the like.

Figure 9B:
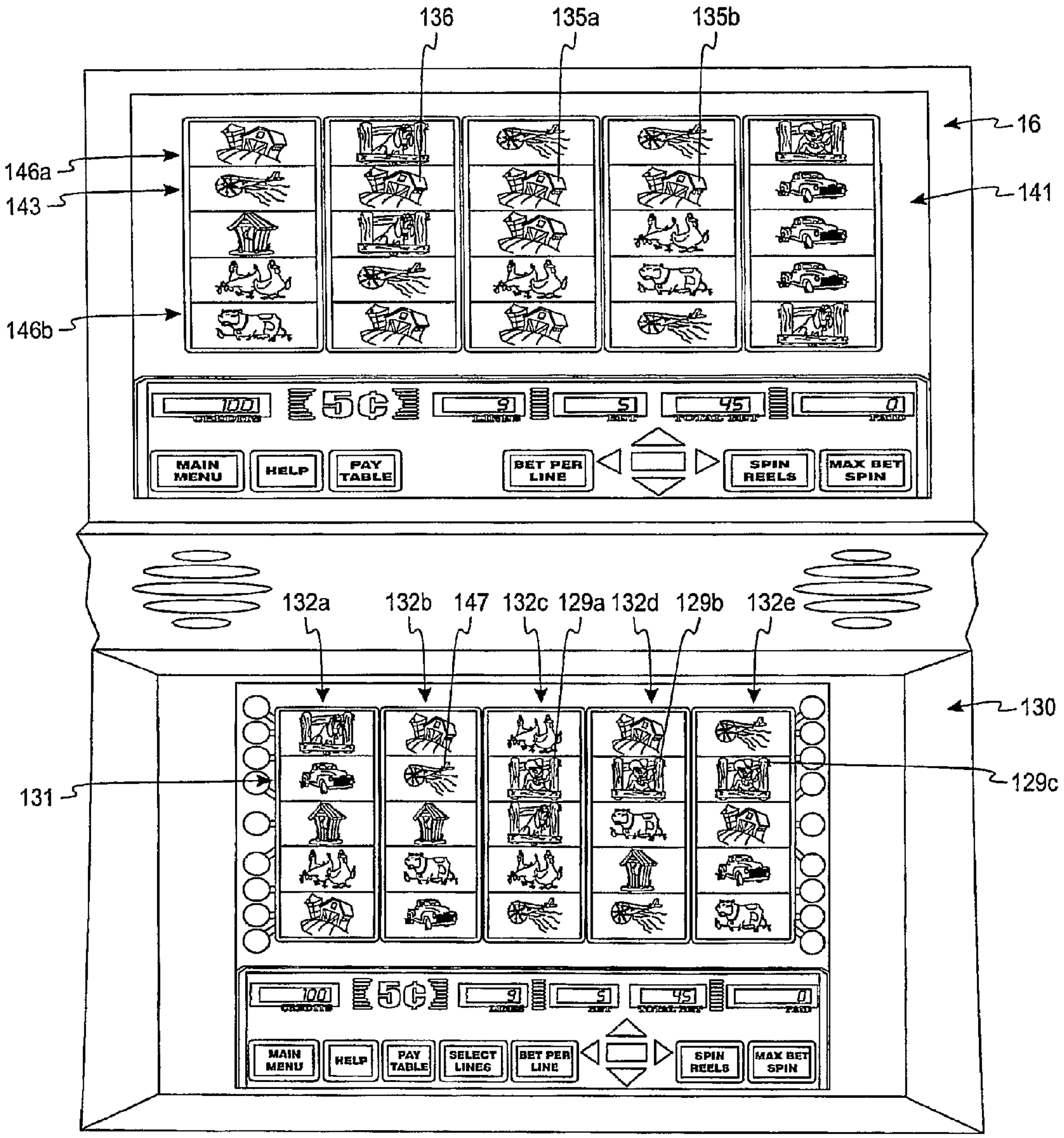
FIG. 9*b* is a display of a basic game screen and a secondary screen subsequent to FIG. 9*a;*

Referring to the embodiment of FIGS. 9*a-d*, a winning combination includes at least three matching symbols beginning in a first column 132*a* reading from left to right and/or beginning in a fifth column 132*e* reading from right to left on an activated pay line. Thus, in the embodiment of FIG. 9*a*, for example, a winning combination of girl symbols 129*a-c* of a first array 130 is achieved on the primary display 14 during an initial, basic game. Each of the girl symbols 129*a-c* is positioned in a second row 131 and in a third column 132*c*, a fourth column 132*d*, and a fifth column 132*e*, respectively, of the first array 130. The player may then be awarded the corresponding initial payout and/or a bonus game. According to the embodiment of FIGS. 9*a,b*, the bonus game is conducted on the secondary display 16 and a corresponding secondary array 134 displayed thereon. In the illustrated embodiment of FIG. 9*b*, during the bonus game, symbols 135*a-c* in the secondary array 134 located in cells 70 having a position corresponding with the position of cells containing the winning combination of girl symbols 129*a-c* in the first array 130 (i.e., the second row 131, the third, fourth, and fifth columns 132*c-e*) are placed on "autohold," or frozen in the corresponding cell positions. The remaining cells of the secondary array 134 are, for example, shifted downward, resulting in a modified secondary array 141 (see FIG. 9*b*). It is contemplated that the remaining cells may be shifted at least one cell in other directions (i.e., up, down, right, left, or combinations thereof), scrambled, cascaded, or the like. The modified secondary array 141 may be evaluated to determine whether any new winning symbol combinations have been achieved. In the embodiment of FIG. 9*b*, a winning symbol combination includes any contiguous combination of three matching symbols. Thus, a second row 143 of the modified secondary array 141 includes a second winning combination of contiguous farmhouse symbols 135*a,b*, 136.

According to one embodiment, the wagering game of FIGS. 9*a,b* includes a recursive feature in which the bonus game "flip-flops" between being played on the primary display 14 and on. the secondary display 16. For example, in addition to the payout awarded for the winning combination of farmhouse symbols 135*a,b*, 136 in FIG. 9*b*, the player may be awarded a second bonus game in which symbols 147, 129*a,b* in the first array 130 located in cells having a position corresponding with the position of the cells containing the winning combination of farmhouse symbols 135*a,b*, 136 in the modified secondary array 141 (i.e., the second row 131, the second, third, and fourth columns 132*b-d*) are placed on "autohold." Thus, the second, third, and fourth symbols 147, 129*a,b* in the second row 131 of the first array 130 are autoheld. The remaining cells of the first array 130 are, for example, shifted downward, resulting in a new first array 149 (see FIG. 9*c*). It is contemplated that the remaining cells may be shifted in other directions (i.e., up, down, right, left, or combinations thereof), scrambled, cascaded, or the like. This flip-flopping between the array of the primary display 14 and the array of the secondary display 16 may continue until no more winning symbol combinations are achieved. Alternatively, the recursive feature may continue for a predetermined number of times (e.g., based on the number of credits initially wagered by the player).

Figure 9C:
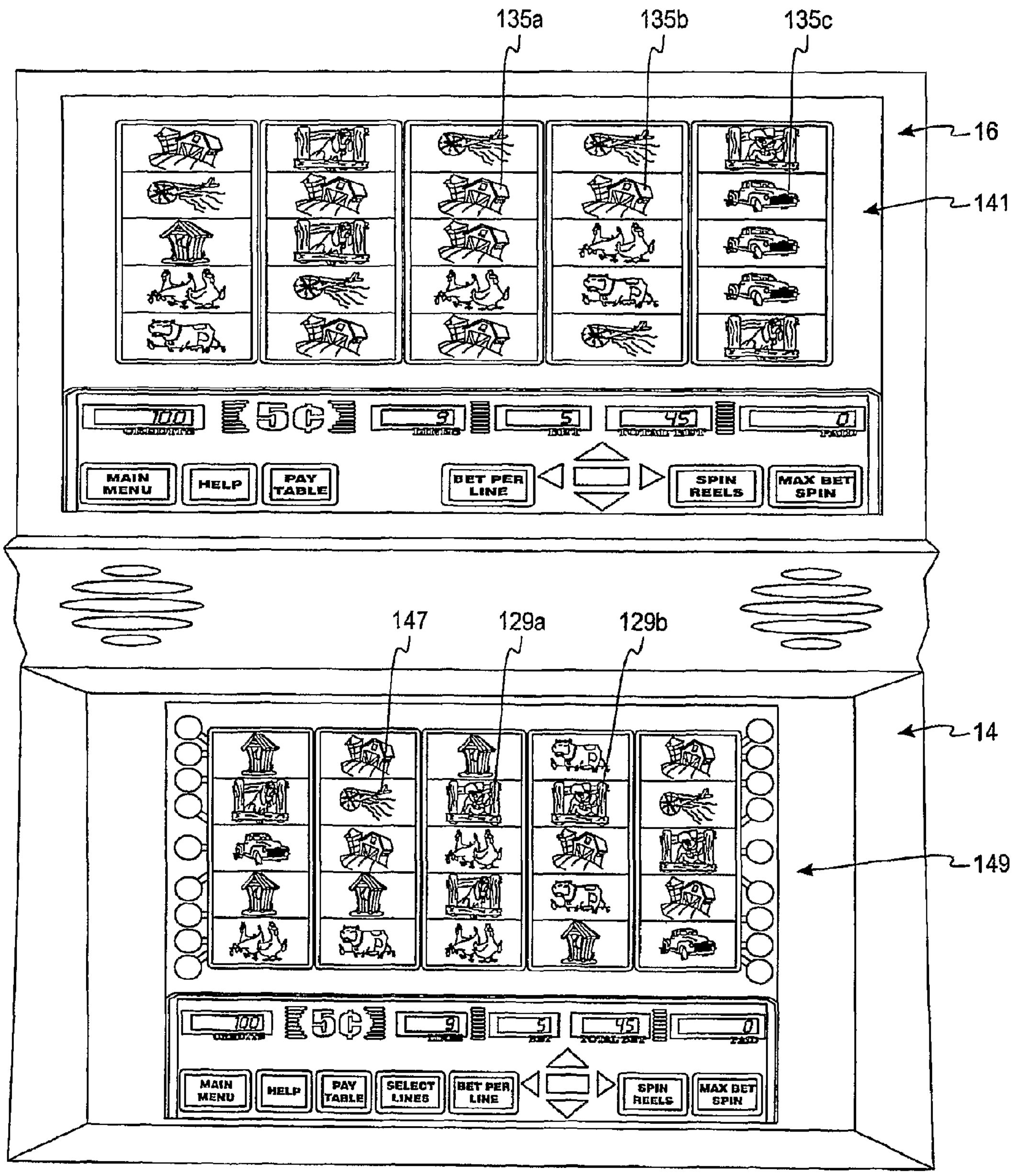
FIG. 9*c* is a display of a basic game screen and a secondary screen subsequent to FIG. 9*b;*

Although in the illustrated embodiment of FIGS. 9*b-c*, random, new symbols have been added to the top rows of the modified arrays 141, 149, it is contemplated that the symbols of the bottom rows of the modified arrays 141, 149 may wrap around the corresponding columns and become positioned in the top rows of the modified arrays 141, 149.

Figure 9D:
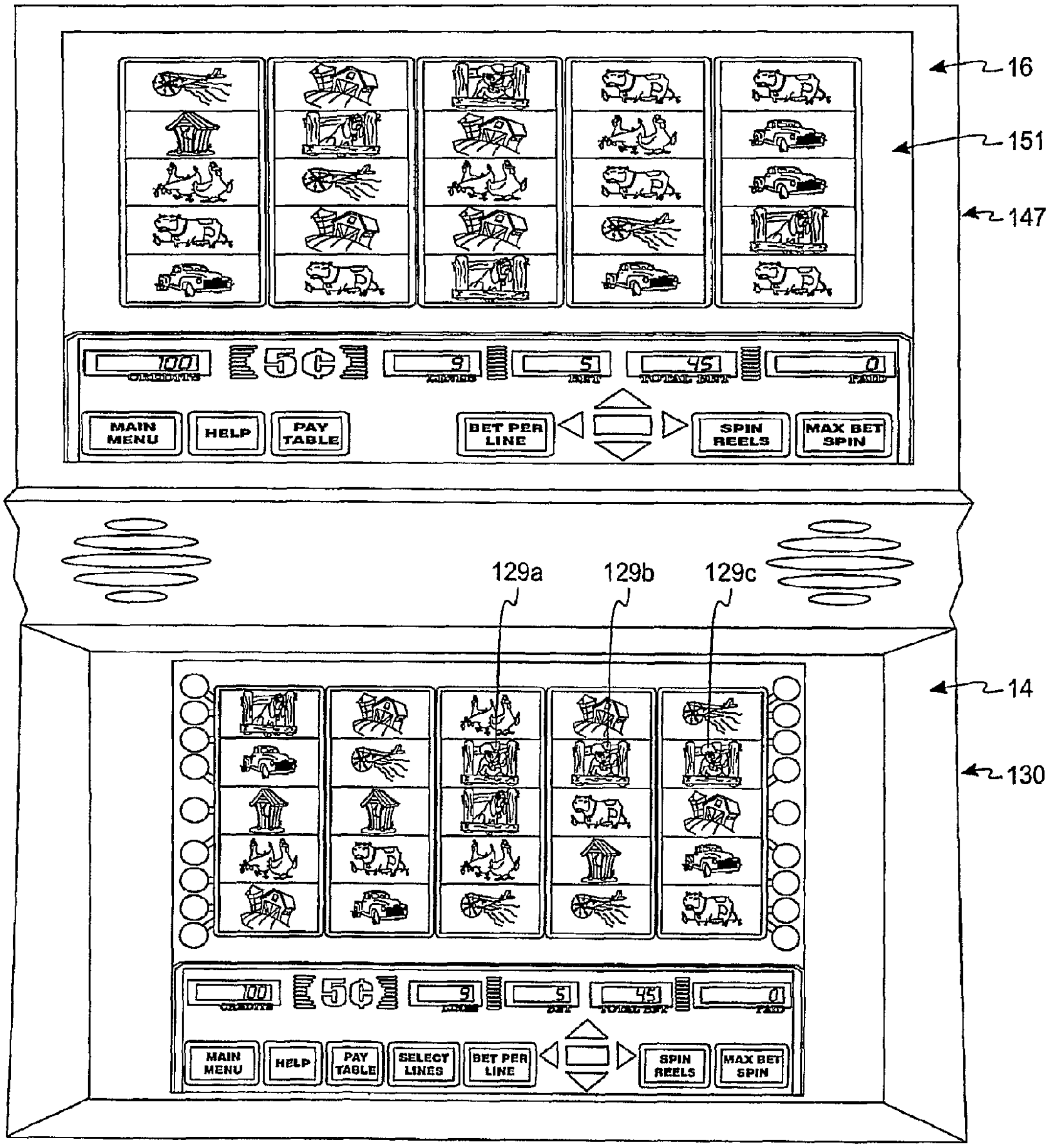
FIG. 9*d* is a display of a basic game screen and a secondary screen subsequent to FIG. 9*c;*

According to another embodiment, at least one of the symbols located in the cells in the secondary array corresponding with the position of at least one of the cells containing a winning combination of symbols in the primary array cascades. Generally, in a cascade, a symbol in the primary display 14 disappears, and a symbol that is adjacent to the disappearing symbol moves and fills in the position vacated by the disappearing symbol. For example, the cascade may occur from top to bottom, meaning that the symbol above the disappearing symbol drops into the vacant position. Thus, the symbols located above the cascaded symbols shift downward. Referring back to FIG. 9*a*, for example, the farmhouse symbols 135*a,b* and the truck symbol 135*c* of the secondary array 134 corresponding with the winning combination of girl symbols 1291-*c* of the first array 130 cascade, and the symbols above the farmhouse symbols 135*a,b* and the truck symbol 135*c* shift downward. A resulting array 147 is shown in FIG. 9*d*. The resulting array 147 may then be evaluated and a corresponding payout may be awarded. It is contemplated that this embodiment may include the recursive feature described above.

It is contemplated that the cells in the embodiment of FIGS. 9*a-d* may be shifted in other directions (i.e., up, down, left, right, or combinations thereof) by one or more cell positions. Non-limiting examples of how this direction may be determined are described above with respect to the embodiments of FIGS. 6*a-c* and 7*a-c*.

According to another embodiment, a method of conducting a wagering game is provided. The method comprises displaying an array of symbols in a primary array, the array of symbols indicating a randomly selected outcome of the wagering game on a primary display. The method further comprises, in response to the randomly selected outcome including a winning symbol combination, cascading at least one secondary symbol in a secondary array displayed on a secondary display. A position of the at least one secondary symbol in the secondary array corresponds to a position of a winning symbol of the winning symbol combination in the primary array.

According to another embodiment, a method of conducting a wagering game is provided. The method comprises displaying an array of symbols in a primary array, the array of symbols indicating a randomly selected outcome of the wagering game on a primary display. The method further comprises, in response to the randomly selected outcome including a winning symbol combination, holding at least one secondary symbol in a secondary array displayed on a secondary display while shifting other symbols within the secondary array. A position of the at least one secondary symbol in the secondary array corresponds to a position of a winning symbol of the winning symbol combination in the primary array.

Stacking or Replacing Symbols in Secondary Display

Figure 10A:
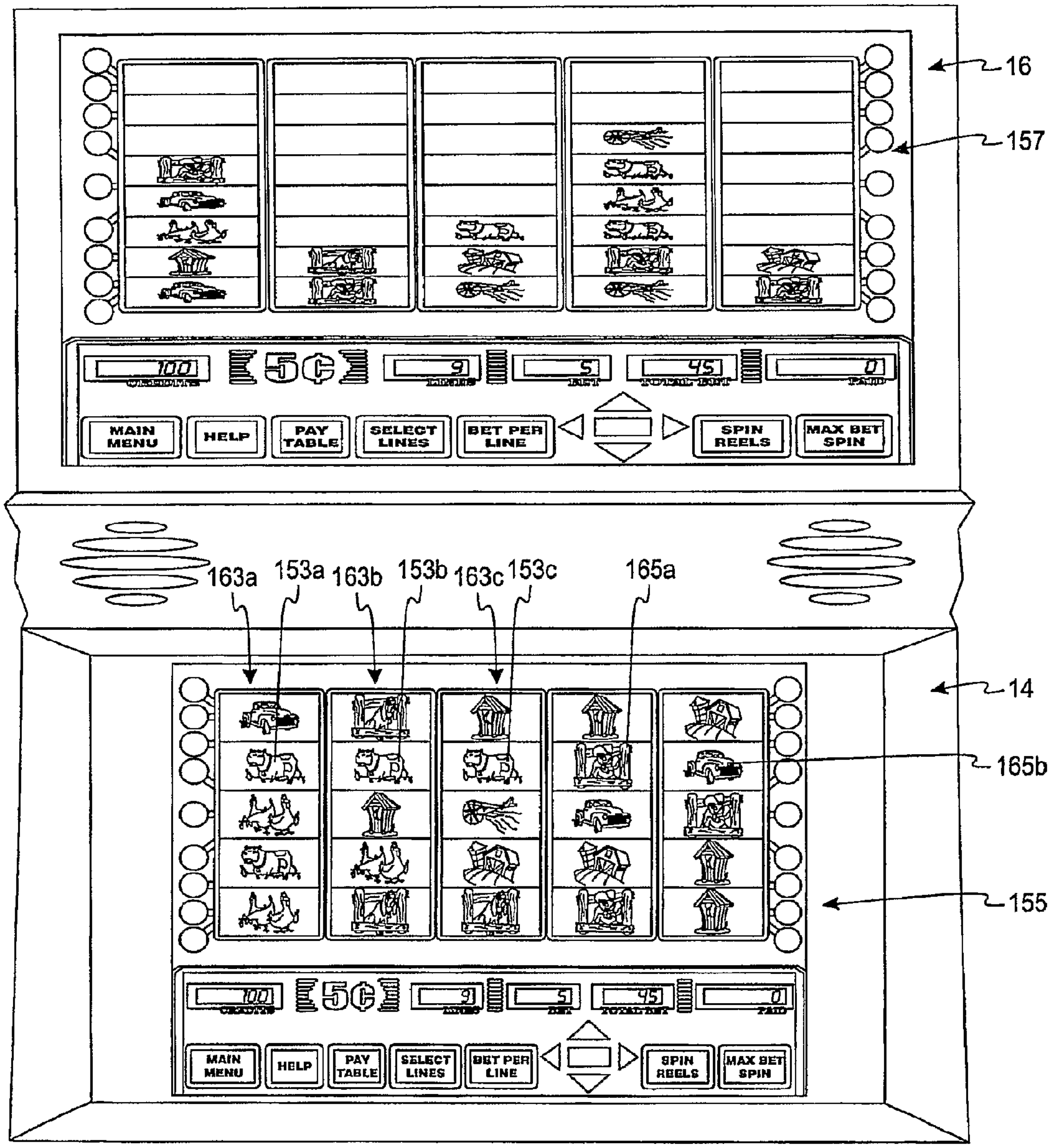
FIG. 10*a* is a display of an initial basic game screen and a secondary screen according to another embodiment of the present invention.
Figure 10B:
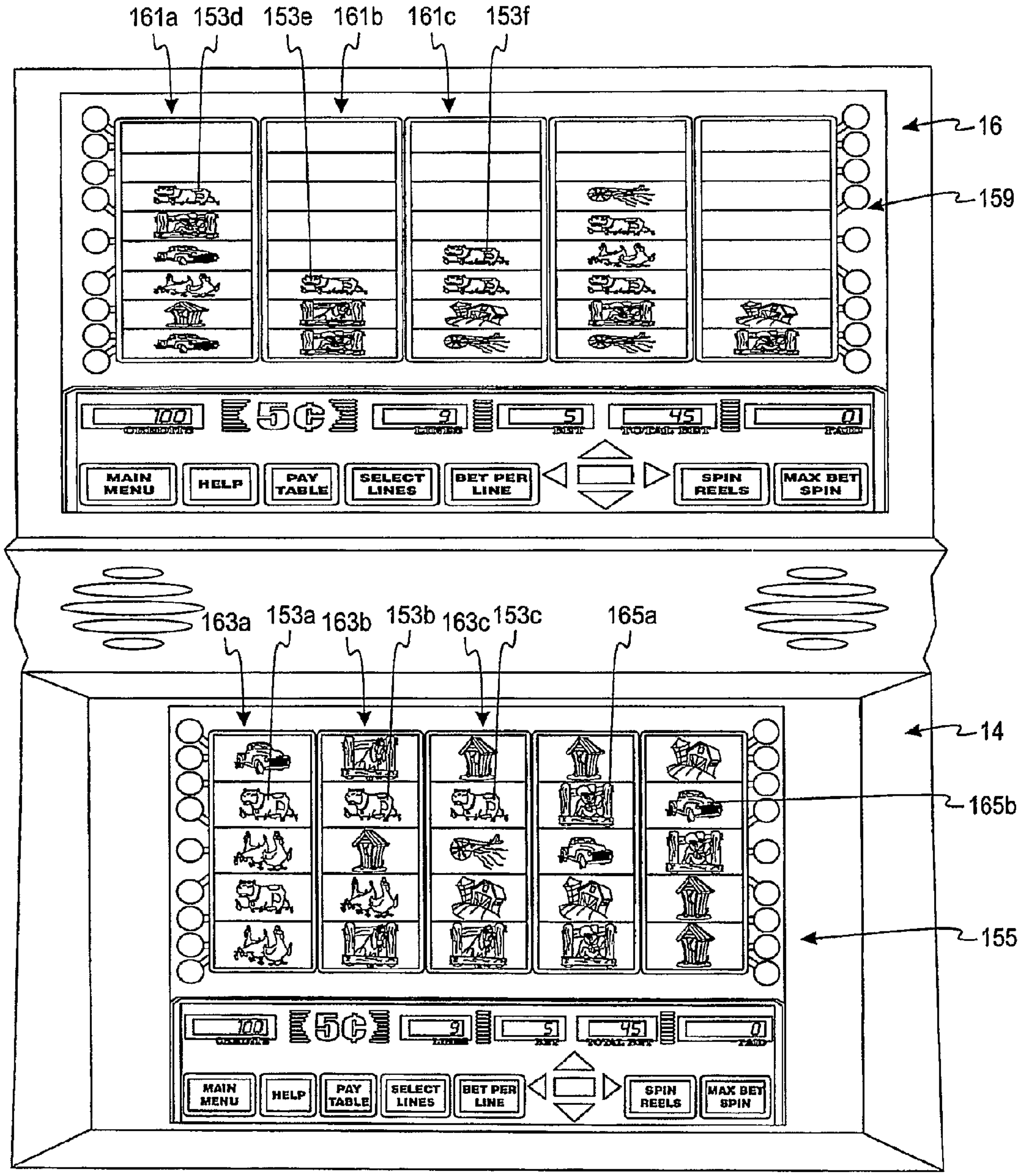
FIG. 10*b* is a display of a basic game screen and a secondary screen subsequent to FIG. 10*a;*

According to another embodiment of the present invention, winning symbols or non-winning symbols of an array of the primary display 14 of an initial basic game is added to a secondary array of the secondary display 16 to populate the secondary array of the secondary display 16. The winning symbols or non-winning symbols of the array of the primary display may be duplicated on the secondary array or moved into the secondary array. Referring to FIG. 10*a*, for example, a winning combination of cow symbols 153*a-c* is achieved on a first array 155 of the primary display 14. The winning combination of cow symbols 153*a-c* is duplicated and stacked (cow symbols 153*d-f*) onto a secondary array 157 of the secondary display 16, as shown in FIG. 10*b*. A resulting modified secondary array 159 (FIG. 10*b*) of the secondary display 16 may then be evaluated to determine whether new winning symbol combinations have been achieved. The evaluation of the modified secondary array 159 may be undertaken when the array 159 is filled or at other times prior to the filling of the array 159.

In the embodiment of FIG. 10*b*, each symbol in the winning combination of cow symbols 153*a-c* is duplicated and stacked in a column 161*a,b,c* of the modified secondary array 159 corresponding to a column 163*a,b,c* of the first array 155 (FIG. 10*a*) in which the winning cow symbols 153*a-c* were located. It is contemplated, however, that the symbols may be stacked in other ways (e.g., all in the same column, in randomly selected columns, etc.).

Although the secondary arrays 157, 159 of FIGS. 10*a,b* are incomplete, it is contemplated that the symbols may be stacked in a complete array. The symbols stacked onto a complete array may, for example, push the symbols located in a bottom row off of the array so that they are no longer a component of the array.

Furthermore, although in the illustrated embodiments, the winning combination of symbols is stacked, it is contemplated that losing symbols or combinations of winning and losing symbols may be stacked. One non-limiting example includes stacking the non-winning symbols of a winning row on the array of the secondary display. Referring to FIG. 10*a*, for example, non-winning symbols 165*a,b* may be stacked in the secondary array 151. It is contemplated that other symbols of the winning array may also be stacked (e.g., the entire row containing the winning symbol combination, etc.). It is also contemplated that the winning symbols may be duplicated and stacked vertically within a single column of the secondary array. It may be desirable for the array of the secondary display to be taller (i.e., include additional rows), as shown in the illustrated embodiment of FIGS. 10*a,b*, so that the accumulation of stacked symbols may be displayed.

Figure 11A:
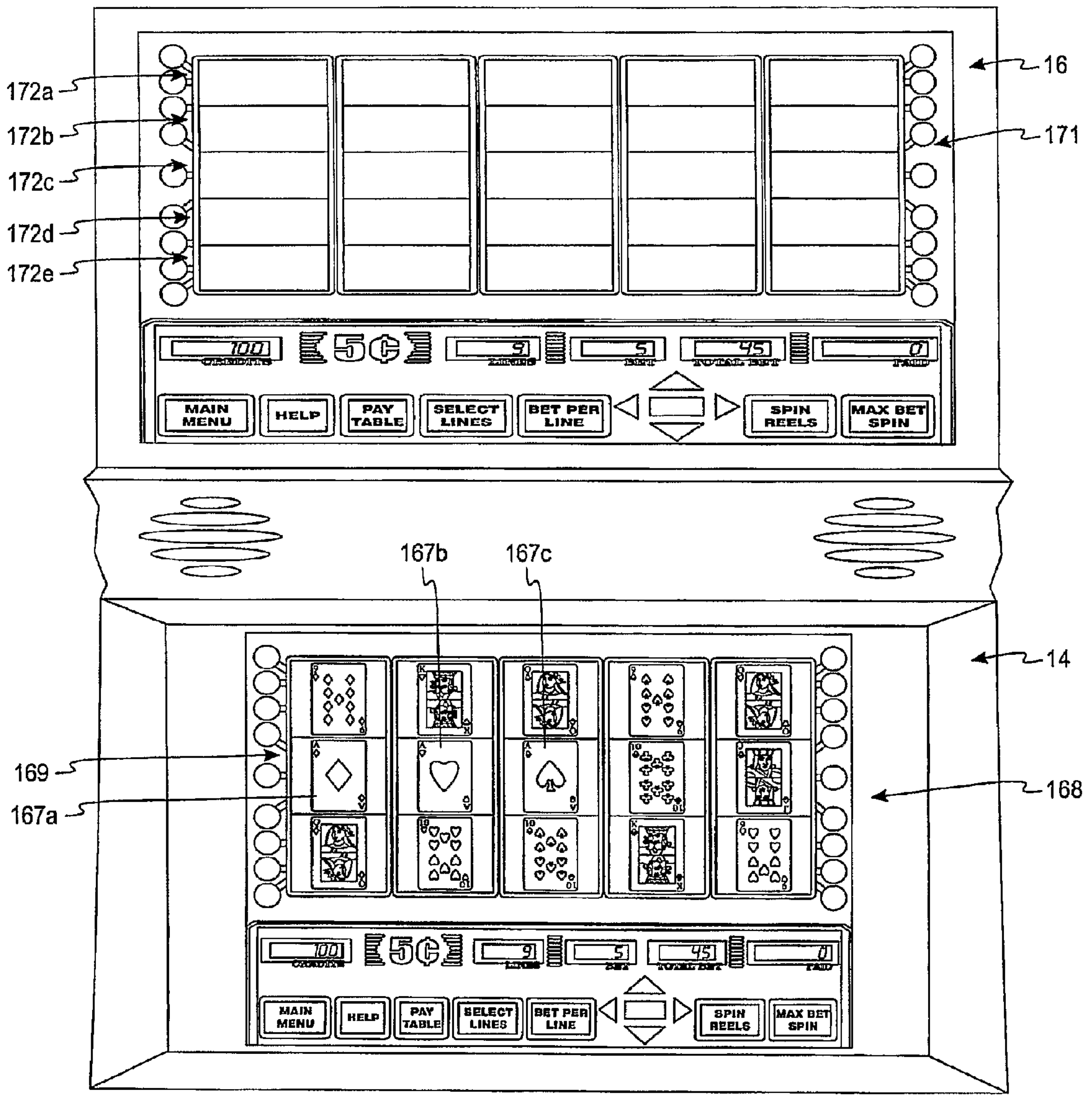
FIG. 11*a* is a display of an initial basic game screen and a secondary screen according to another embodiment of the present invention.
Figure 11B:
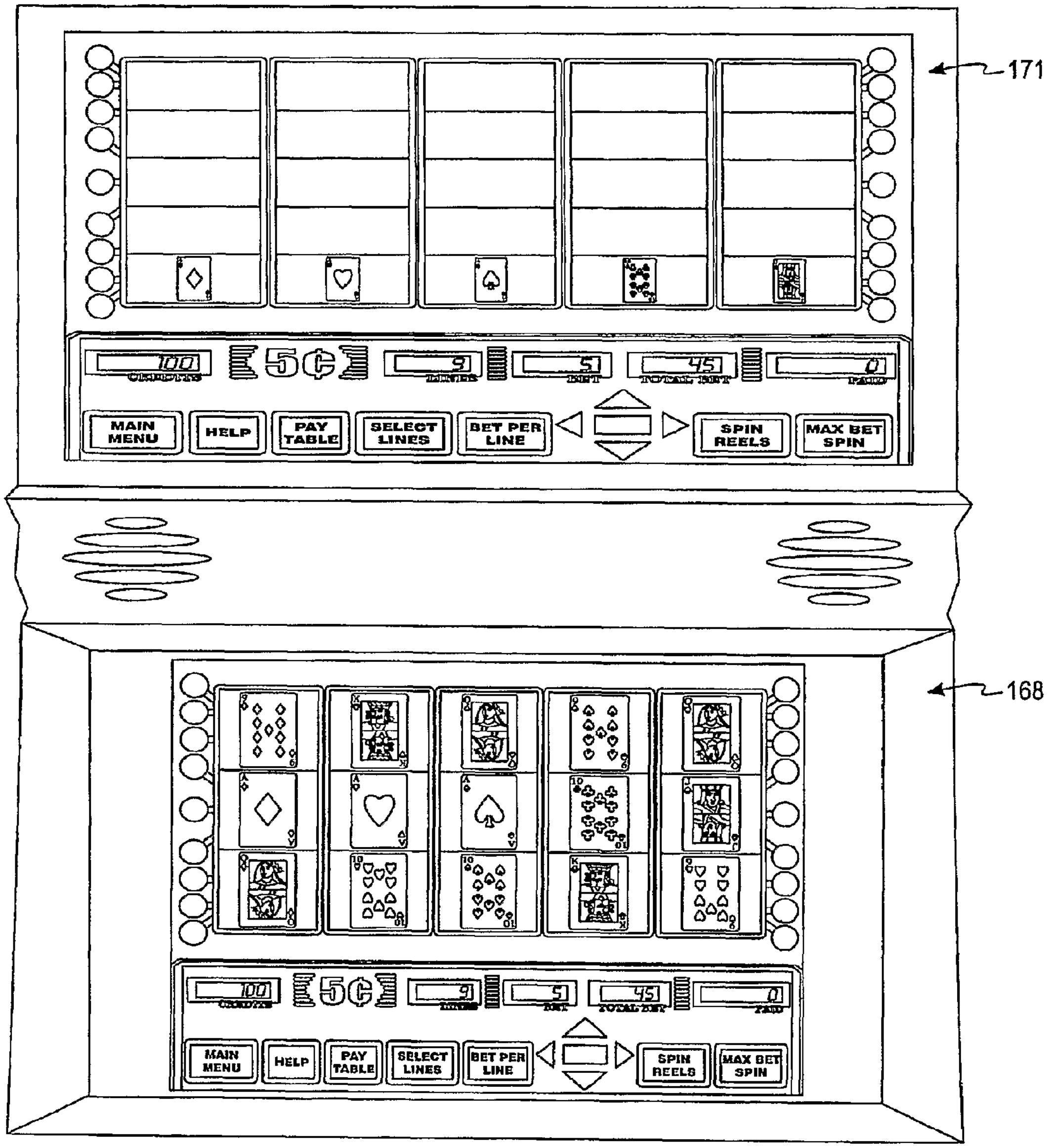
FIG. 11*b* is a display of a basic game screen and a secondary screen subsequent to FIG. 11*a.*

According to another embodiment illustrated in FIG. 11*a*, a winning symbol combination of three aces 167*a-c* has been achieved in a first-array 168 of the primary display 14. As shown in FIG. 11*b*, an entire row 169 including the winning symbol combination 167*a-c* has been duplicated and stacked in a secondary array 171 of the secondary display 16. It is also contemplated that only the winning or losing symbols may be duplicated in the secondary array 171. According to the illustrated embodiment, each time a winning symbol combination is achieved in an array of the primary display 14, the row including the winning symbol combination is duplicated and stacked above in the secondary array 171.

The secondary array 171 of the illustrated embodiment becomes full and complete after five winning symbol combinations (corresponding to five rows in the secondary array 171) are achieved on the array of the primary display 14. Any or all active pay lines of the completed secondary array 171 may then be evaluated. It is contemplated that pay lines of the completed secondary array 171 including the duplicated/stacked winning symbol combination may be inactivated to avoid repeated payouts for the same winning symbol combinations. After evaluating the completed secondary array 171, the symbols of the secondary array may be cleared. Evaluating the secondary display 171 after the secondary array 171 has been completely filled may provide the player with added incentive to continue playing the wagering game.

Alternatively or additionally, the secondary array 171 may be evaluated each time new symbols are added to the secondary array 171. Moreover, once the secondary array 171 is full (i.e., each cell 70 includes a symbol), additional winning symbol combinations may be stacked, for example in the top row of the secondary array 171, thus forcing the remaining symbols down one row. Therefore, the symbols positioned in the bottom row would be forced off of the display. It is also contemplated that the winning symbol combinations may be added to the secondary array 171 in other positions. For example, the symbols may be added to a position in the secondary array 171 corresponding to the position of the symbols in the first array 168. In some embodiments, it is contemplated that the payout for each winning symbol combination may only occur once to avoid repeated payouts for the same winning symbol combination. In other embodiments, the gaming machine 10 may pay out for the winning combination of symbols of the initial game again.

It is contemplated that the symbols may be stacked in columns other than the columns corresponding with the column of the first array in which the winning symbols were positioned. It is also contemplated that the recursive feature described above may be applied to the embodiments of FIGS. 11*a,b*.

Figure 12A:
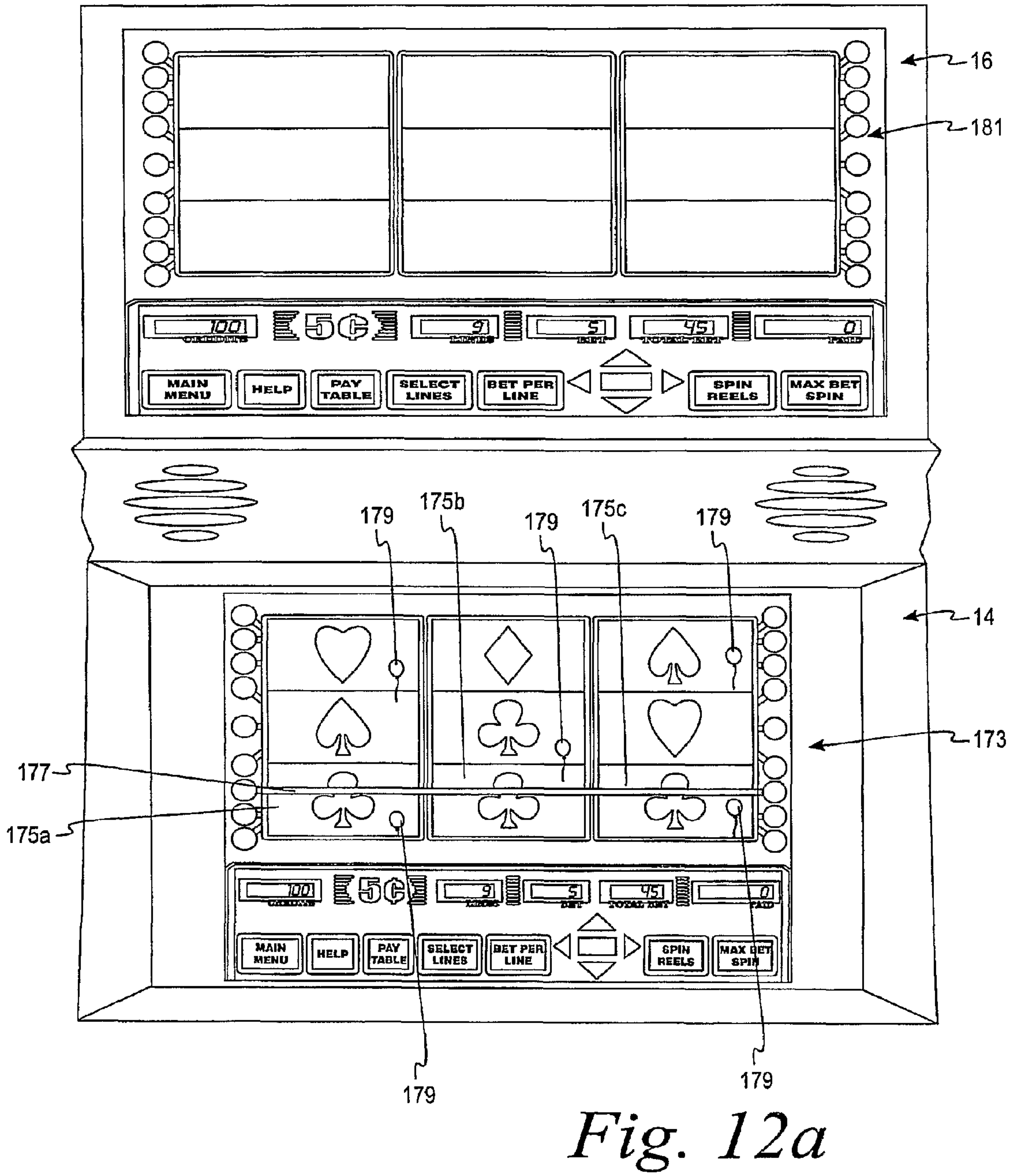
FIG. 12*a* is a display of an initial basic game screen and a secondary screen according to another embodiment of the present invention.
Figure 12B:
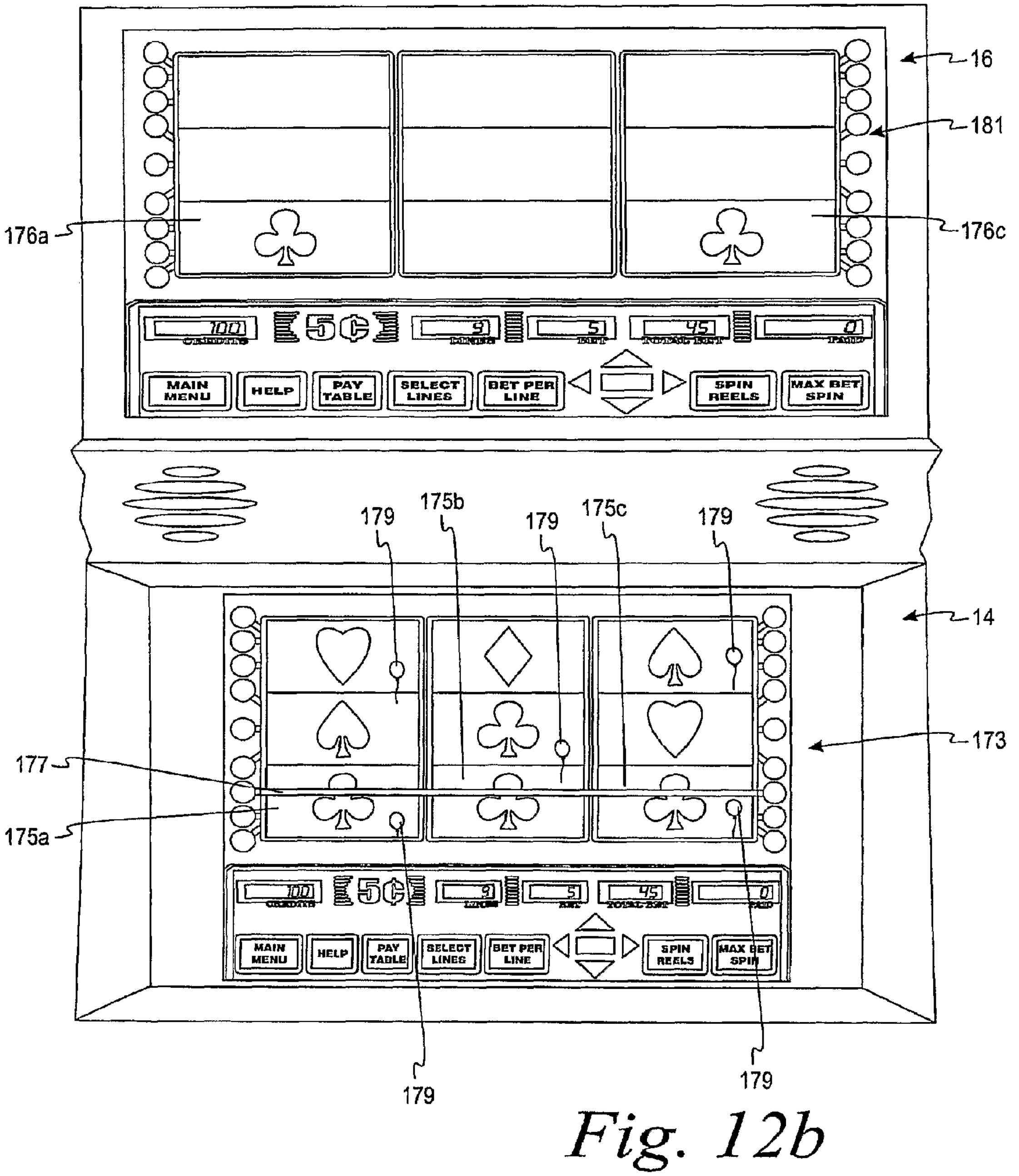
FIG. 12*b* is a display of a basic game screen and a secondary screen subsequent to FIG. 12*a.*

According to another embodiment of the present invention, when a winning combination of symbols is achieved on the array of the primary display 14, any or all cells having a particular feature, symbol, subscript, or other indicia therein are duplicated and moved to the array of the secondary display. Turning to the illustrated embodiment of FIG. 12*a*, for example, a first array 173 of the primary display 14 includes a winning combination of club symbols 175*a-c* located on a pay line 177 corresponding with a bottom row. The player may then be awarded a bonus game in which the winning symbols of the winning combination of symbols having a balloon subscript 179 are duplicated and added to a secondary array 181 of the secondary display 16. In the illustrated embodiment, only two of the three club symbols of the winning combination of star symbols 175*a-c* have a balloon subscript 179. Thus, according to the embodiment of FIG. 12*b*, the two club symbols have been duplicated (i.e., club symbols 176*a,b*) and stacked in the secondary array 181.

It is contemplated, however, that any or all of the symbols in the winning first array 173 having a balloon subscript 179 may be duplicated or moved and added to the secondary array 181. Furthermore, it is contemplated that other indicators may be used to determine which symbols from the winning first array 173 are added to the secondary array 181. Although in the illustrated embodiments of FIGS. 12*a,b*, the secondary array of the secondary display 16 is initially empty, it is contemplated, that the secondary array may include symbols stacked during previous games and/or by previous players, etc. Thus, the array of the secondary display 16 may be full or partially full. The symbols from the primary array may then be stacked above or below the existing symbols of the secondary array, thereby forcing the existing symbols of the secondary array up or down, respectively.

Figure 12C:
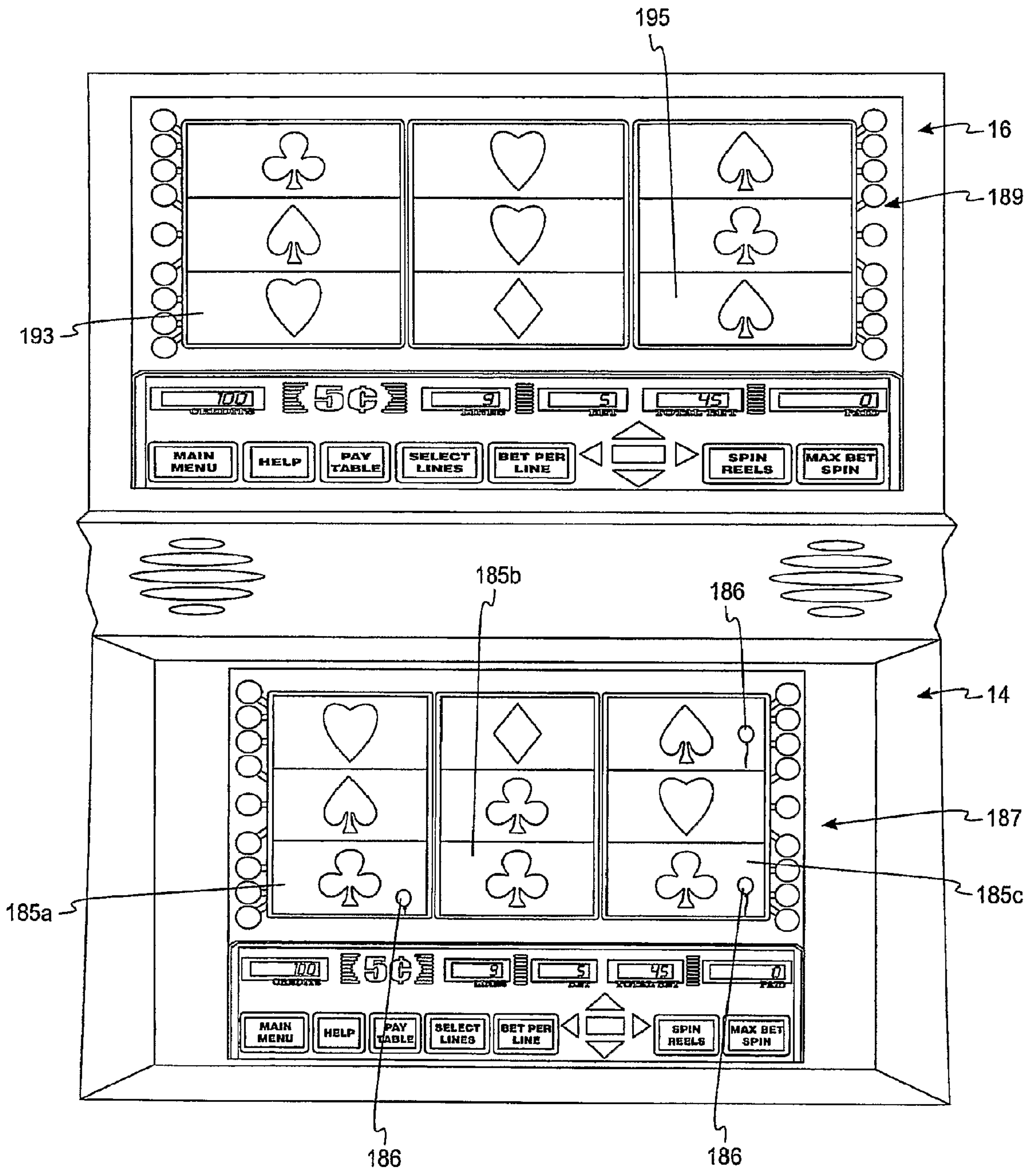
FIG. 12*c* is a display of a basic game screen and a secondary game screen according to yet another embodiment of the present invention.
Figure 12D:
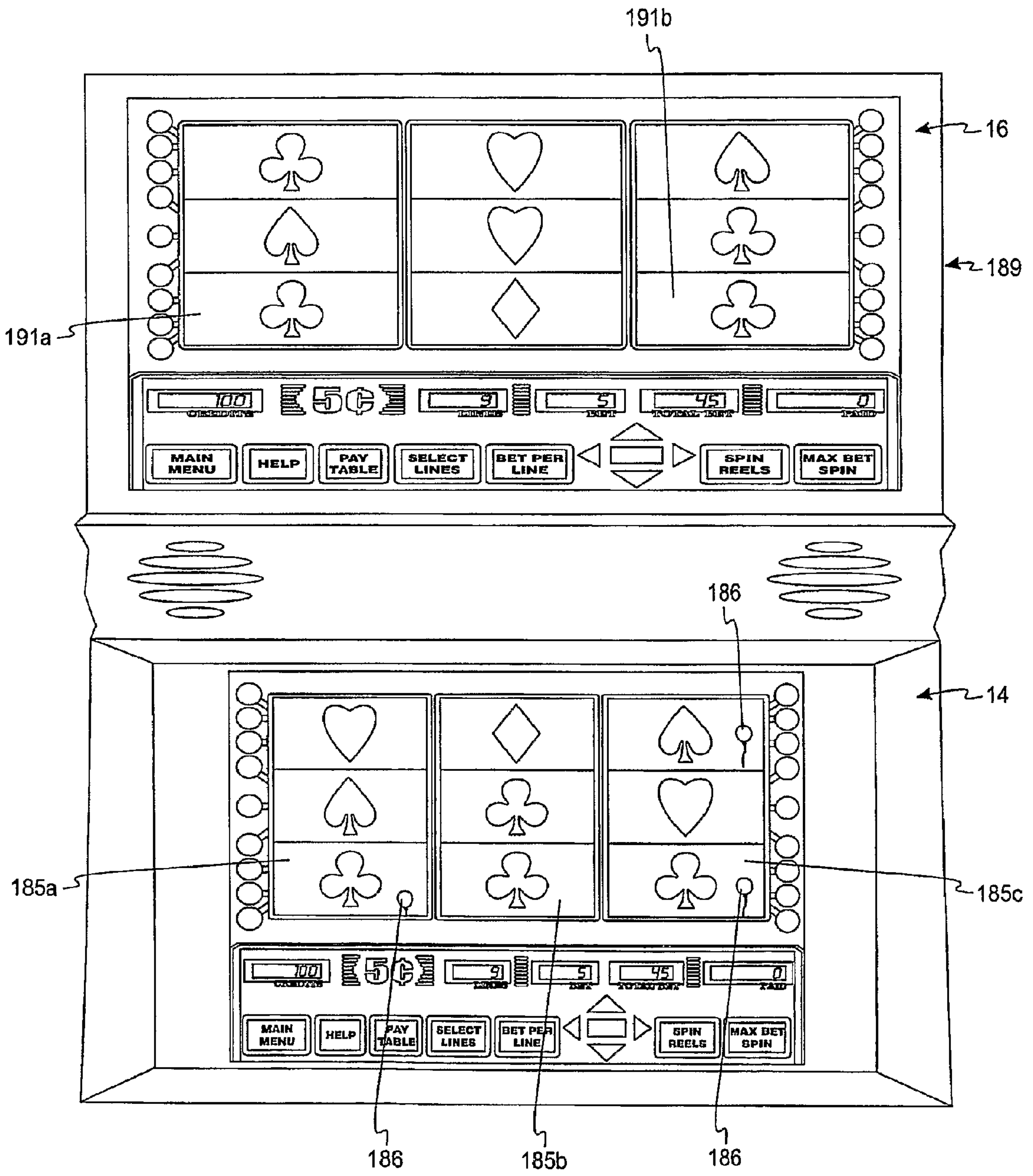
FIG. 12*d* is a display of a basic game screen and a secondary screen subsequent to FIG. 12*c.*

Referring now to FIGS. 12*c,d*, winning club symbols 185*a,c* having a balloon subscript 186 thereon in an array 187 are duplicated and/or moved to positions in a secondary array 189 corresponding to the positions of the winning club symbols 185*a,c* in the primary array. In the embodiment of FIG. 12*c*, the secondary array 189 is initially full (i.e., all of the cells include at least one symbol). Thus a heart symbol 193 and a spade symbol 195 of FIG. 12*c* positioned in cells corresponding to the position of the star symbols 185*a,c* are removed and replaced by the duplicated club symbols 191*a,b*, as shown in FIG. 12*d*.

It is contemplated that at least one symbol of the secondary array 181, 189 may include a subscript. Thus, according to one embodiment, if the duplicated symbols that have been moved into the secondary array 181, 189 cause a winning symbol combination to be created, a recursive feature, as described above, may be triggered.

According to another embodiment, a method of conducting a wagering game having a randomly selected outcome is provided. The method comprises displaying a plurality of symbols in a first array indicating the randomly selected outcome. The method further comprises, in response to a winning outcome being indicated by a first winning symbol combination, duplicating at least one symbol to create at least one duplicated symbol. The method further comprises populating a secondary array displayed on a secondary display with the at least one duplicated symbol in a predetermined fashion. The method further comprises, in response to the populating, providing an additional award for a second winning symbol combination that is present in the secondary array.

Although in the illustrated embodiments, a winning combination is shown to trigger a bonus game or spin, it is contemplated that other predetermined criterion may also be used. Furthermore, although in the illustrated embodiments, the winning symbol combinations are positioned on pay lines, it is contemplated that the winning symbol combinations may be positioned elsewhere within the array. For example, the symbols of the winning symbol combinations may be scattered, adjacent to each other, or the like. Furthermore, it is contemplated that an additional and/or side wager may be required to participate in any or all of the bonus games described herein.

Additionally, while the illustrated embodiments of the present invention are generally shown using a video display, it is contemplated that a transmissive display may also be used with any of the embodiments described above to enhance the of the movement of the symbols. It is also contemplated that the embodiments utilizing a primary display and a secondary display may use, for example, mechanical reels in the primary display and video reels in the secondary display.

Each of these embodiments and obvious variations thereof is contemplated as falling within the spirit and scope of the claimed invention, which is set forth in the following claims.

What is claimed is:

1. A method of conducting a wagering game on a gaming system with an input device and a display device, the method comprising:

receiving a wager input via the input device;

displaying, via the display device, an array of cells populated with a plurality of symbols, the displayed array including a playable portion and a non-playable portion, wherein the playable portion includes a first subset of the symbols displayed in the array and the non-playable portion includes a second subset of the symbols displayed in the array, the first subset of symbols indicating a first randomly selected outcome of the wagering game;

after displaying the array of cells populated with the plurality of symbols, determining if the first randomly selected outcome of the wagering game in the playable portion includes a first winning symbol combination;

in response to the first randomly selected outcome of the wagering game in the playable portion including the first winning symbol combination, designating within the displayed array of cells a first modified playable portion including a third subset of the plurality of symbols displayed in the array, the third subset of symbols indicating a second outcome of the wagering game, the first modified playable portion including at least one first new cell from the non-playable portion;

determining if the second outcome of the wagering game in the first modified playable portion includes a second winning symbol combination; and in response to the second outcome of the wagering game in the first modified playable portion including the second winning symbol combination, designating within the displayed array of cells a second modified playable portion including a fourth subset of the plurality of symbols displayed in the array, the fourth subset of symbols indicating a third outcome of the wagering game, the second modified playable portion including at least one second new cell from the non-playable portion, wherein the symbols populating the playable portion, the non-playable portion, the first modified playable portion, and the second modified playable portion are displayed simultaneously in the displayed array of cells.

2. The method of claim 1, wherein a respective number of new cells from the non-playable portion included in each of the first and second modified playable portions depends, at least in part, on the value of the wager input.

3. The method of claim 1, wherein the first and second modified playable portions each has the same number of cells as the playable portion.

4. The method of claim 1, wherein, prior to designating the first modified playable portion, at least one active cell in the playable portion is deactivated, and the method further comprises activating the at least one first new cell from the non-playable portion.

5. The method of claim 1, wherein the non-playable portion and the playable portion are continuously displayed prior to and after designating the first and second modified playable portions.

6. The method of claim 1, wherein a player selects the at least one first and second new cells from the non-playable portion to be included in the first and second modified playable portions.

7. The method of claim 1, wherein the at least one first and second new cells each includes a respective plurality of cells that form an additional row of cells of the first and second modified playable portions.

8. The method of claim 1, wherein the third and fourth subsets of symbols in the second and third outcomes of the wagering game each includes one or more of the symbols in the first outcome of the wagering game.

9. The method of claim 8, wherein the display device includes a plurality of movable reels with the plurality of symbols populating the array, and wherein the at least one first and second new cells each includes a respective additional column of cells located on one of the plurality of movable reels positioned adjacent to the playable portion.

10. The method of claim 1, further comprising:

sequentially randomly highlighting different cells within the non-playable portion;

in response to receiving a stop command from a player, stopping the randomly highlighting such that one or more cells of the non-playable portion are highlighted, wherein the at least one first new cell to be included in the first modified playable portion is the one or more highlighted cells of the non-playable portion.

11. A computer program product comprising a non-transient computer-readable storage medium encoded with instructions, the instructions being configured to cause a gaming system, upon execution by one or more controllers, to complete the acts of:

receiving an indication of a wager input to play a wagering game;

displaying an array of cells populated with a plurality of symbols, the displayed array including a playable portion and a non-playable portion, wherein the playable portion includes a first subset of the symbols displayed in the array and the non-playable portion includes a second subset of the symbols displayed in the array, the first subset of symbols indicating a first randomly selected outcome of the wagering game;

after displaying the array of cells populated with the plurality of symbols, determining if the first randomly selected outcome of the wagering game in the playable portion includes a first winning symbol combination;

in response to the first randomly selected outcome of the wagering game in the playable portion including the first winning symbol combination, designating within the displayed array of cells a first modified playable portion including a third subset of the plurality of symbols displayed in the array, the third subset of symbols indicating a second outcome of the wagering game, the first modified playable portion including at least one symbol from the non-playable portion;

determining if the second outcome of the wagering game in the first modified playable portion includes a second winning symbol combination; and in response to the second outcome of the wagering game in the first modified playable portion including the second winning symbol combination, designating within the displayed array of cells a second modified playable portion including a fourth subset of the plurality of symbols displayed in the array, the fourth subset of symbols indicating a third outcome of the wagering game, the second modified playable portion including another at least one new cell symbol from the non-playable portion, wherein the symbols populating the playable portion, the non-playable portion, the first modified playable portion, and the second modified playable portion are displayed simultaneously in the displayed array of cells.

12. A gaming system comprising:

an input device configured to receive a wager input to play a wagering game;

a display device configured to display an array of cells including a playable portion and a non-playable portion shown continuously with the playable portion; and one or more controllers operatively connected to the display device, the one or more controllers being configured to:

(i) direct the display device to populate the array of cells with a plurality of symbols, the playable portion and the non-playable portion each including a respective subset of the symbols displayed in the array, the respective subset of symbols of the playable portion indicating a randomly selected outcome of the wagering game;

(ii) after the array of cells are populated with the plurality of symbols, determine if the randomly selected outcome of the wagering game in the playable portion includes a winning symbol combination;

(iii) responsive to the randomly selected outcome of the wagering game displayed in the playable portion including the winning symbol combination, direct the display device to designate within the displayed array of cells a modified playable portion including another respective subset of the plurality of symbols displayed in the array, the respective subset of symbols of the modified playable portion indicating a modified outcome of the wagering game, the modified playable portion including at least one new cell from the non-playable portion;

(iv) determine if the modified outcome of the wagering game in the modified playable portion includes another winning symbol combination;

(v) responsive to the modified outcome of the wagering game displayed in the modified playable portion including another winning symbol combination, direct the display device to designate within the displayed array of cells another modified playable portion including yet another respective subset of the plurality of symbols displayed in the array indicating another modified outcome of the wagering game, the another modified playable portion including another at least one new cell from the non-playable portion; and (vi) repeat steps (iv) and (v) until the modified outcome of the wagering game in the modified playable portion does not include another winning symbol combination, a threshold number of modifications is reached, or both, wherein the symbols populating the playable portion, the non-playable portion, and the modified playable portions are displayed simultaneously in the displayed array of cells.

13. The gaming system of claim 12, wherein the one or more controllers are further configured to:

(vii) responsive to the randomly selected outcome of the wagering game displayed in the playable portion including the winning symbol combination, direct the display device to sequentially randomly highlight different cells within the non-playable portion; and (viii) responsive to receiving a stop command from a player, direct the display device to stop the randomly highlighting such that one or more cells of the non-playable portion are highlighted, wherein the at least one new cell to be included in the modified playable portion is the one or more highlighted cells of the non-playable portion.

14. The gaming system of claim 12, wherein each of the at least one new cells to be included in each of the modified playable portions is randomly selected by the one or more controllers.

15. The gaming system of claim 12, wherein a respective number of new cells from the non-playable portion included in each of the modified playable portions depends, at least in part, on the value of the wager input.

16. The gaming system of claim 12, wherein each of the modified playable portions includes all of the cells of the playable portion.

17. The gaming system of claim 12, wherein each of the modified playable portions is the same number of cells as the playable portion.

18. The gaming system of claim 12, wherein each of the modified playable portions includes all of the symbols displayed in the playable portion.

19. The gaming system of claim 12, wherein each of the at least one new cells can be any of a single new cell, multiple new cells, an additional row of new cells, or an additional column of new cells of the non-playable portion.

* * * * *

UNITED STATES PATENT AND TRADEMARK OFFICE

CERTIFICATE OF CORRECTION

PATENT NO. : 8,419,519 B2
APPLICATION NO. : 12/299567
DATED : April 16, 2013
INVENTOR(S) : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this
First Day of September, 2015

Michelle K. Lee

Michelle K. Lee
*Director of the United States Patent and Trademark Office*